(12) United States Patent  
Iwabuchi et al.

(10) Patent No.: US 11,729,494 B2  
(45) Date of Patent: Aug. 15, 2023

(54) INFORMATION PROCESSING APPARATUS, CONTROL METHOD THEREFOR, AND STORAGE MEDIUM

(71) Applicant: CANON KABUSHIKI KAISHA, Tokyo (JP)

(72) Inventors: Kohei Iwabuchi, Kanagawa (JP); Yuuichi Nitto, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/243,343

(22) Filed: Apr. 28, 2021

(65) Prior Publication Data

US 2021/0321036 A1    Oct. 14, 2021

Related U.S. Application Data

(63) Continuation of application No. PCT/JP2019/040201, filed on Oct. 11, 2019.

(30) Foreign Application Priority Data

Oct. 30, 2018    (JP) .................................. 2018-204383

(51) Int. Cl.
*G03B 15/00* (2021.01)
*H04N 23/60* (2023.01)
(Continued)

(52) U.S. Cl.
CPC ............ *H04N 23/64* (2023.01); *H04N 23/62* (2023.01); *H04N 23/695* (2023.01); *H04N 23/698* (2023.01)

(58) Field of Classification Search
None
See application file for complete search history.

(56) References Cited

U.S. PATENT DOCUMENTS 5,400,110 A * 3/1995 Soshi .................... G02B 7/102
396/257
8,194,136 B1 * 6/2012 Askey ............. H04N 5/232933
348/175

(Continued)

FOREIGN PATENT DOCUMENTS

CN    101753844 A    6/2010
CN    103888659 A    6/2014
(Continued)

*Primary Examiner* — Shadan E Haghani
(74) *Attorney, Agent, or Firm* — Canon U.S.A., Inc. IP Division

(57) ABSTRACT

An information processing apparatus includes one or more processors that function as a first acquisition unit configured to acquire information about an image-capturing environment including a physical relationship between an imaging apparatus and an object plane, a second acquisition unit configured to acquire information indicating a condition about image quality of an image to be captured by the imaging apparatus, a decision unit configured to decide an image-capturing parameter with which the object plane is fit in a depth of field in a case where the image-capturing parameter is set in the imaging apparatus, based on the information acquired by the first acquisition unit, and a presentation unit configured to present to a user a range on the object plane in which an image obtained by image capturing with the image capturing apparatus in which the decided image-capturing parameter is set satisfies the condition about image quality.

17 Claims, 17 Drawing Sheets

(51) Int. Cl.
*H04N 23/62* (2023.01)
*H04N 23/695* (2023.01)
*H04N 23/698* (2023.01)

(56) References Cited

U.S. PATENT DOCUMENTS

| | | | |
|---|---|---|---|
| 2007/0146511 A1* | 6/2007 | Kinoshita | H04N 9/0451 348/E9.01 |
| 2007/0267584 A1* | 11/2007 | Cherry | G02B 13/08 250/555 |
| 2018/0103209 A1* | 4/2018 | Fischler | G06F 3/04815 |
| 2018/0167565 A1* | 6/2018 | Abe | G06T 5/50 |

FOREIGN PATENT DOCUMENTS

| | | | | |
|---|---|---|---|---|
| CN | 106803883 A | | 6/2017 | |
| CN | 107220992 A | * | 9/2017 | G06T 7/246 |
| EP | 3407590 B1 | * | 2/2021 | G01M 5/0033 |
| JP | 4-211211 A | | 8/1992 | |
| JP | 2001054008 A | | 2/2001 | |
| JP | 2001136514 A | | 5/2001 | |
| JP | 2010011105 A | | 1/2010 | |
| JP | 2011229008 A | | 11/2011 | |
| JP | 2011259168 A | | 12/2011 | |
| JP | 2014150310 A | | 8/2014 | |
| WO | 2014147917 A1 | | 9/2014 | |
| WO | 2017002512 A1 | | 1/2017 | |
| WO | 2017/126368 A1 | | 7/2017 | |

* cited by examiner

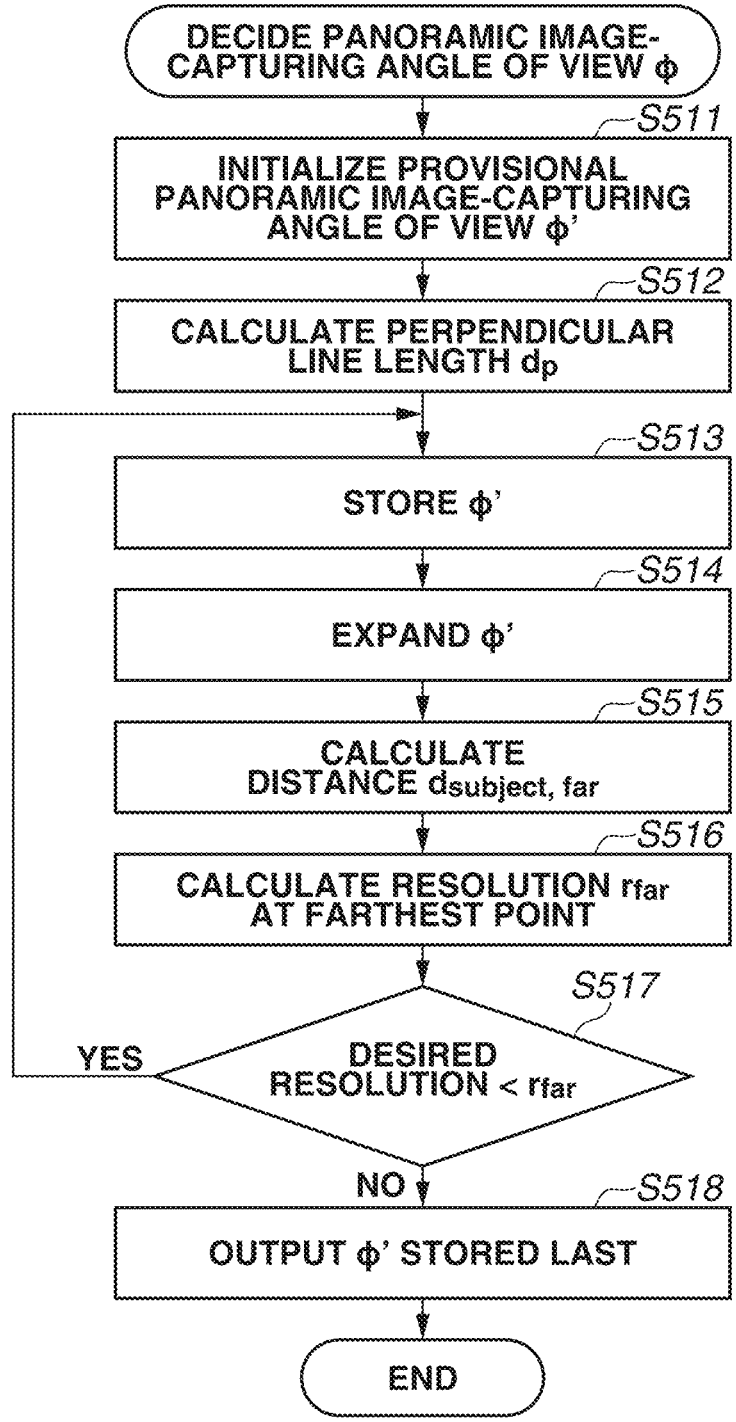

FIG.6

| ID (601) | FOCAL DISTANCE (F-NUMBER) (mm) (602) | APERTURE (F-NUMBER) (603) |
|---|---|---|
| 0 | 24 | 4 |
| 1 | 24 | 5.6 |
| 2 | 24 | 8 |
| 3 | 24 | 11 |
| 4 | 35 | 5.6 |
| 5 | 35 | 8 |
| 6 | 35 | 11 |
| 7 | 50 | 8 |
| 8 | 50 | 11 |
| 9 | 70 | 11 |
| ⋮ | ⋮ | ⋮ |

FIG.11A

| ID | IMAGE-CAPTURING POSITION |
|---|---|
| 0 | x1, y1 |
| 1 | x2, y2 |
| 2 | x3, y3 |
| 3 | x4, y4 |
| ⋮ | ⋮ |

FIG.11B

| ID | IMAGE-CAPTURING POSITION | CONFIRMATION STATE |
|---|---|---|
| 0 | x1, y1 | CONFIRMED |
| 1 | x2, y2 | CONFIRMED |
| 2 | x3, y3 | UNCONFIRMED |
| 3 | x4, y4 | CONFIRMED |
| ⋮ | ⋮ | ⋮ |

INFORMATION PROCESSING APPARATUS, CONTROL METHOD THEREFOR, AND STORAGE MEDIUM

CROSS-REFERENCE TO RELATED APPLICATIONS

This application is a Continuation of International Patent Application No. PCT/JP2019/040201, filed Oct. 11, 2019, which claims the benefit of Japanese Patent Application No. 2018-204383, filed Oct. 30, 2018, both of which are hereby incorporated by reference herein in their entirety.

BACKGROUND OF THE INVENTION

Field of the Invention

The present invention relates to an image-capturing support system for a panoramic image composed of a plurality of images.

Background Art

A method of analyzing a captured image (a picture) of a structure to grasp the presence/absence or temporal change of a deformation, such as a crack or rust, has been proposed as part of a procedure for inspecting a structure. It is necessary to capture a high-definition image of a wall surface of a structure to detect a minute deformation in millimeters from the captured image. Thus, a panoramic image capturing method of dividing an image-capturing target range into a plurality of areas and capturing an image of each of the areas can be adopted. For a panoramic image capturing, an image-capturing system in which a camera platform apparatus and an imaging apparatus are combined to automatically drive pan and tilt in sequence, because it is necessary to perform image capturing a large number of times to avoid image-capturing omission for an entire image-capturing range.

In PTL 1, a distance to an object is acquired and a lens focus position to be used for each image-capturing area is decided for each of partial areas into which an image-capturing target range is divided, and afterwards, actual image capturing for the plurality of image-capturing areas is sequentially executed, so that an image in focus is obtained for each of the areas.

In a case where an image-capturing target is a huge structure, such as a dam, the rotation angle of a camera platform apparatus in panoramic image capturing is large because of the size thereof, and thus an image with strong tilt is captured. Further, as for a structure, such as a dam having a discharge channel at the center on the front of the dam, there is also a situation where strong tilt cannot be avoided, such as a situation where an imaging apparatus cannot be installed in a place directly facing the structure, in many cases. Meanwhile, in structure inspection based on an image, a high resolution at a certain level or higher is necessary to accurately estimate the actual size of a deformation from the image, in addition to a satisfactory focusing state of the deformation. In a state where strong tilt is present with respect to an image-capturing target, the difference between a near part and a far part in terms of distance from an imaging apparatus to an object is large, and thus it is difficult to obtain a high-resolution image. However, conventionally, there has been no established technology for supporting panoramic image capturing to obtain a high-resolution image of a large object. Therefore, troublesome work has been involved, such as repeating image capturing while trying parameters on the imaging apparatus side on user's own judgment.

CITATION LIST

Patent Literature

PTL1: Japanese Patent Application Laid Open No. 2011-237713

SUMMARY OF THE INVENTION

The present invention is made in view of the foregoing, and aims to support work for capturing an image having a necessary resolution, in panoramic image capturing for capturing an image of a large object.

To solve the above-described issues, an information processing apparatus includes one or more processors that function as a first acquisition unit configured to acquire information about an image-capturing environment including a physical relationship between an imaging apparatus and an object plane, a second acquisition unit configured to acquire information indicating a condition about image quality of an image to be captured by the imaging apparatus, a decision unit configured to decide an image-capturing parameter with which the object plane is fit in a depth of field in a case where the image-capturing parameter is set in the imaging apparatus, based on the information acquired by the first acquisition unit, and a presentation unit configured to present to a user a range on the object plane in which an image obtained by image capturing with the image capturing apparatus in which the decided image-capturing parameter is set satisfies the condition about image quality.

Further features of the present invention will become apparent from the following description of exemplary embodiments with reference to the attached drawings.

BRIEF DESCRIPTION OF THE DRAWINGS

FIG. 5B is a flowchart illustrating an example of processing to be executed by the information processing apparatus 100.

FIG. 6 is a table illustrating an example of data to be generated in the panoramic image capturing support system.

FIG. 11A is a table illustrating an example of data to be generated in the panoramic image capturing support system.

DESCRIPTION OF THE EMBODIMENTS

Information processing of embodiments according to the present invention will be described in detail below with reference to the drawings. Configurations to be described in the embodiments are examples, and are not intended to limit the scope of the present invention to those configurations.

First Exemplary Embodiment

Figure 1:
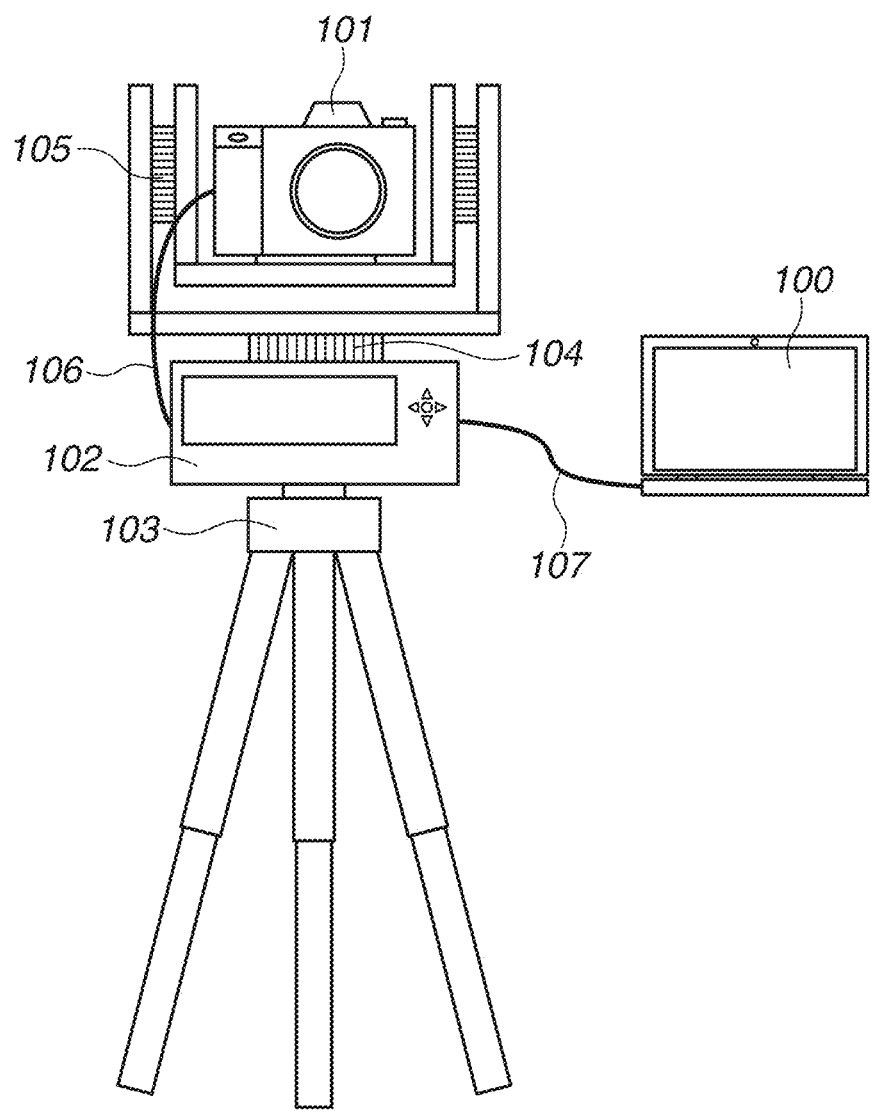
FIG. 1 is a diagram illustrating an example of a configuration of a panoramic image capturing system including an information processing apparatus 100.

A panoramic image capturing support system for supporting an imaging apparatus that controls a digital camera installed on an electronic camera platform and performs panoramic image capturing for a structure will be described as a first exemplary embodiment. In the present exemplary embodiment, the panoramic image capturing is an image-capturing method of dividing an image-capturing target range into a plurality of areas, and performs image capturing for each of the areas. In other words, a plurality of images covering the entire image-capturing target range is obtained through a plurality of times of image capturing. In the definition of the panoramic image capturing in the present exemplary embodiment, whether processing of combining the obtained plurality of images into one image is present or absent does not matter. FIG. 1 is a diagram illustrating an example of a configuration of a panoramic image capturing system including the information processing apparatus 100. In FIG. 1, an imaging apparatus 101 is installed on a camera platform apparatus 102, and fixed by a tripod 103. A drive unit 104 and a drive unit 105 drive the camera platform apparatus in a pan direction and a tilt direction, respectively. The imaging apparatus 101 is connected to the camera platform apparatus 102 by a communication cable 106. The information processing apparatus 100 is a control apparatus for the panoramic image capturing system, and the information processing apparatus 100 includes a display and an input device (a keyboard and a pointing device). In the present exemplary embodiment, a laptop-type computer is used, but a tablet personal computer (PC) with a touch panel display or the like may be used. In the present exemplary embodiment, the information processing apparatus 100 and the camera platform apparatus 102 are connected by the communication cable 107, but may be connected by a wireless network.

Figure 2A:
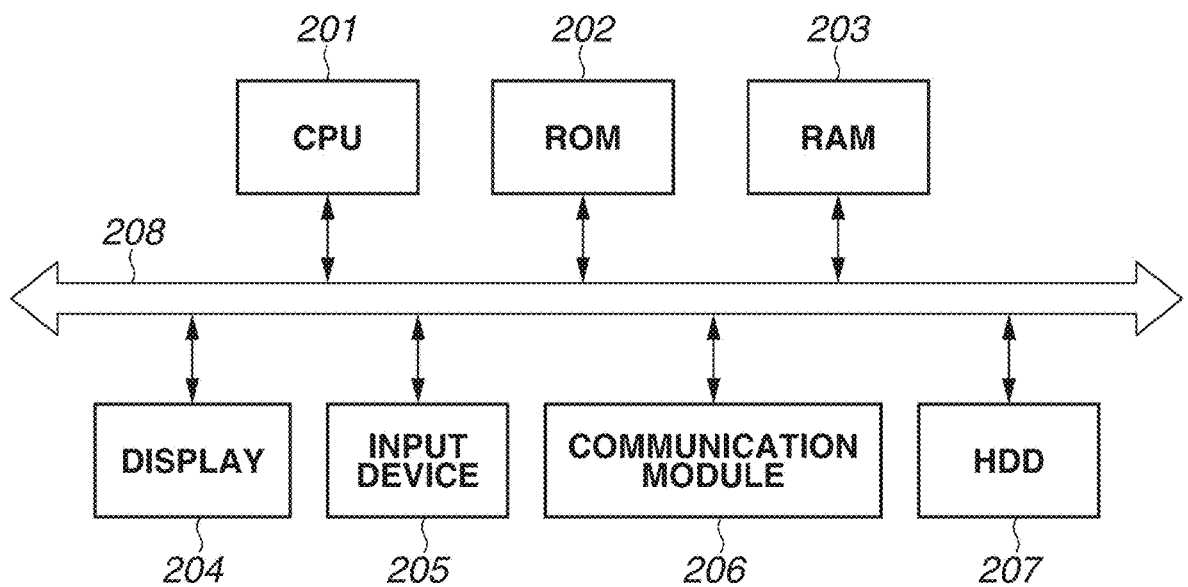
FIG. 2A is a diagram illustrating a hardware configuration and an example of a functional configuration of the information processing apparatus 100.

FIG. 2A is a hardware block diagram illustrating the information processing apparatus 100 operating as a panoramic image capturing support apparatus according to the present exemplary embodiment. A central processing unit (hereinafter referred to as a CPU 201) executes computation and processing of information, and control of each piece of hardware based on a control program, thereby implementing each functional configuration and processing described below. A read only memory (hereinafter referred to as a ROM 202) stores the control program prescribing an operation processing procedure of the CPU 201. The ROM 202 includes a program ROM storing an operating system (OS), which is a system program for controlling devices of the imaging apparatus, and a data ROM storing information necessary to operate a system. A random access memory (hereinafter referred to as a RAM 203) functions as a main memory of the CPU 201, and as a work memory necessary to load a program to be executed and to execute the program. A display 204 is a display unit for displaying various kinds of information output from the information processing apparatus 100, i.e., presenting the information to a user. An input device 205 is a keyboard or a pointing device, such as a mouse, in the present exemplary embodiment, and the input device 205 functions as an input unit for the user to input information into the information processing apparatus 100. A communication module 206 transmits and receives various kinds of information and control signals to be exchanged by the information processing apparatus 100 with the camera platform apparatus 102 and the imaging apparatus 101. A hard disk drive (an HDD 207) functions as an auxiliary memory. However, the HDD 207 may be replaced with an external device connected via a network. An input-output bus 208 corresponds to an address bus, a data bus, and a control bus that connect the above-described modules.

Figure 2B:
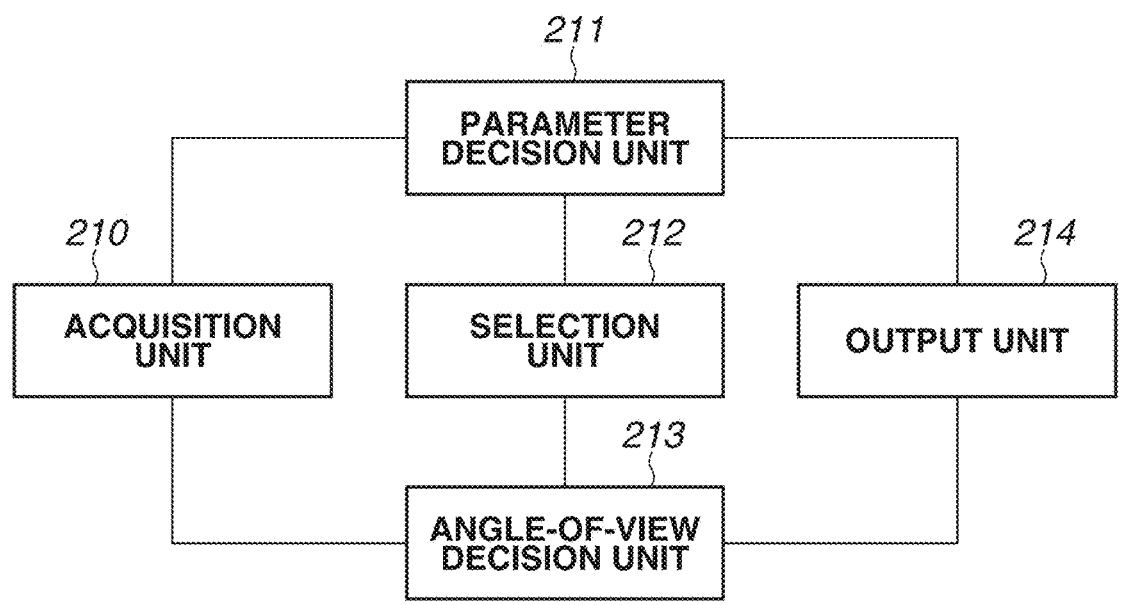
FIG. 2B is a diagram illustrating a hardware configuration and an example of a functional configuration of the information processing apparatus 100.

FIG. 2B is an example of a block diagram illustrating a configuration of software of the information processing apparatus 100. The CPU 201 loads a program stored in the ROM 202 into the RAM 203 and executes processing based on each flowchart described below, so that these function units are implemented. The result of executing each processing is then held in the RAM 203. For example, in a case where hardware is configured as a substitute for the software processing using the CPU 201, a computing unit or a circuit corresponding to the processing of each of the function units described here may be configured.

An acquisition unit 210 acquires image-capturing conditions input by user operations performed in a user interface screen described below. In the present exemplary embodiment, the image-capturing conditions to be input by the user are composed of information about an object, information about an imaging apparatus, information about the positional relationship between the object and the imaging apparatus, and information about image-capturing settings including necessary resolution information. The information about the object according to the present exemplary embodiment is, specifically, information about a height and a width indicating the size of the object. Information defining an image-capturing position at which the imaging apparatus is installed is obtained as the information about the positional relationship between the object and the imaging apparatus. The information about the object, the information about the imaging apparatus, and the information about the positional relationship between the object and the imaging apparatus are collectively referred to as information about an image-capturing environment including the physical relationship between the imaging apparatus and an object plane. As the information about the imaging apparatus, a camera model, the width and height of a single captured image in the panoramic image capturing, and a lens model are input. The system holds specifications (e.g., details of a camera sensor and a lens focal distance range) information for each camera model and each lens model beforehand, so that the input of a model name can be analyzed by replacing with specific numerical information about each specification. Alternatively, a form of acquiring information by the input of each numerical value instead of the input of the model name of a camera/lens may be adopted. The necessary resolution is a resolution to be a condition for accurately estimating the actual size of a deformation in structure inspection work utilizing processing of detecting a deformation generated in a structure by image analysis, and is designated in the form of a specific numerical value or a range of numerical values.

A parameter decision unit 211 decides an image-capturing parameter that needs to be set in the imaging apparatus to obtain a panoramic image having a resolution necessary for the user, based on the image-capturing conditions and the image-capturing position acquired by the acquisition unit 210. In the present exemplary embodiment, the image-capturing parameter is the combination of a focal distance and an aperture (F-number). The parameter decision unit 211 generates a plurality of combinations of focal distance and aperture (F-number). A selection unit 212 selects one from the image-capturing parameters decided by the parameter decision unit 211, based on, for example, a user operation. In the case of the present exemplary embodiment, since the image-capturing parameter is the combination of the focal distance and the F-number, one value for each is selected.

An angle-of-view decision unit 213 decides an image-capturing angle (hereinafter referred to as a panoramic image-capturing angle of view) that enables capturing of an image having a resolution necessary in the panoramic image capturing, based on the information about the image-capturing position acquired by the acquisition unit 210 and the image-capturing parameter selected by the selection unit 212. An output unit 214 outputs the image-capturing parameter decided by the parameter decision unit 211, and the panoramic image-capturing angle of view decided by the angle-of-view decision unit 213. In the present exemplary embodiment, the decided image-capturing parameter and an image indicating the panoramic angle of view are output to the display 204 functioning as a display unit, to be displayed.

Figure 3:
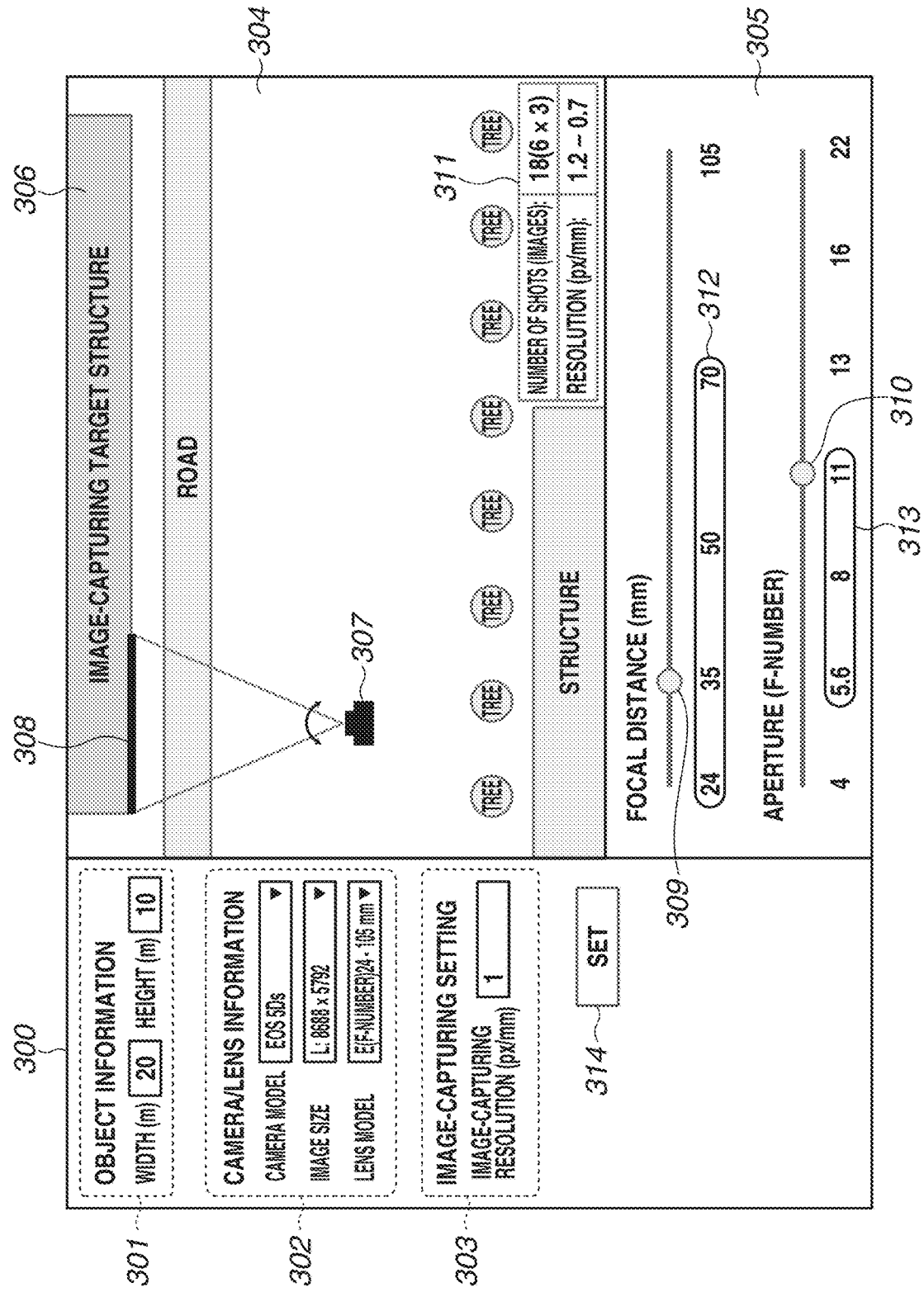
FIG. 3 is a diagram illustrating an example of a user interface of a panoramic image capturing support system.

FIG. 3 is a diagram illustrating an example of a user interface of the panoramic image capturing support system according to the present exemplary embodiment, displayed on the display 204. Areas 301 to 303 in an application screen 300 illustrated in FIG. 3 are areas in which the user inputs the image-capturing conditions. The area 301 is an area for inputting the information about the object, and a text form for inputting a numerical value in meters indicating the width and height of the object is disposed in the case of the present exemplary embodiment. The area 302 is an area for the user to input information about image-capturing equipment. In the present exemplary embodiment, camera models, widths and heights of a single captured image in the panoramic image capturing, and lens models are each displayed in a drop-down list. The user can select one from each of the lists. The area 303 is an area for the user to input a necessary resolution, and a text form for receiving a numerical input in the unit of px/mm is disposed in the present exemplary embodiment.

An area 304 is an area that graphically displays the positional relationship between the object and the imaging apparatus. In the present exemplary embodiment, a layout drawing, an aerial photograph, or other data of a structure is read in as source information and used. The user specifies an object 306 by an operation such as surrounding an object with a rectangle or other shape in the read-in image. The object is expressed using coordinates defined in the source information, and recorded in association with the above-described source information. An area that can be the object may be specified from the source information using an image recognition technology instead of the designation operation by the user. In the area 304, a coordinate system based on the source information is defined. In the area 304, an item 307 is an indicator representing a position at which the imaging apparatus 101 is installed (hereinafter referred to as an image-capturing position). At a stage where the information is input in each of the areas 301 to 303, and the information (the source information, the object, and the image-capturing position) indicating the positional relationship between the object and the imaging apparatus is input, the user designates a set button 314. The information processing apparatus 100 starts processing of calculating the image-capturing parameter based on the input various kinds of information in response to the designation of the set button 314.

An area 305 is an area that displays the image-capturing parameter. In the present exemplary embodiment, the image-capturing parameter represents "focal distance (f)" and "aperture (F-number)" among the various kinds of information to be set in the imaging apparatus 101. In the area 305, the image-capturing parameter is displayed to be selectable using a user interface component on a slider. The maximum length (the movable range of a knob) of each slider is set based on the information about the imaging apparatus input in the area 302. The user can select the focal distance f (mm) by moving a knob 309, and select the aperture (F-number) by moving a knob 310. The ranges of the decided parameters are indicated on the respective sliders in a case where a plurality of parameters is decided as the image-capturing parameter for obtaining the panoramic image having the necessary resolution through processing with the parameter decision unit 211 described below. For example, the range of the decided image-capturing parameter is indicated by graphical figures such as an item 312 and an item 313. The user can select a focal distance from a range indicated by the item 312, and select an F-number from a range indicated by the item 313. Selection of the focal distance can change the range of the F-number surrounded by the item 313, and a change in the F-number can change the range of the focal distance surrounded by the item 312.

An item 308 represents a range of an imagable object plane in a case where the panoramic image capturing is performed from the position indicated by the item 307, using the image-capturing parameter selected by the user by operating the slider in the area 305. In the case of the area 304, the item 308 expresses the width of the image-capturing range because of a bird's-eye view. The item 308 changes depending on the selected image-capturing parameter. An area 311 is an area for displaying information to be referred to in the selection of the image-capturing parameter. In the present exemplary embodiment, the number of images taken in one panoramic image capturing and the theoretical values of the resolutions of the images are displayed, in a case where image capturing is performed using the selected parameter.

Figure 4:
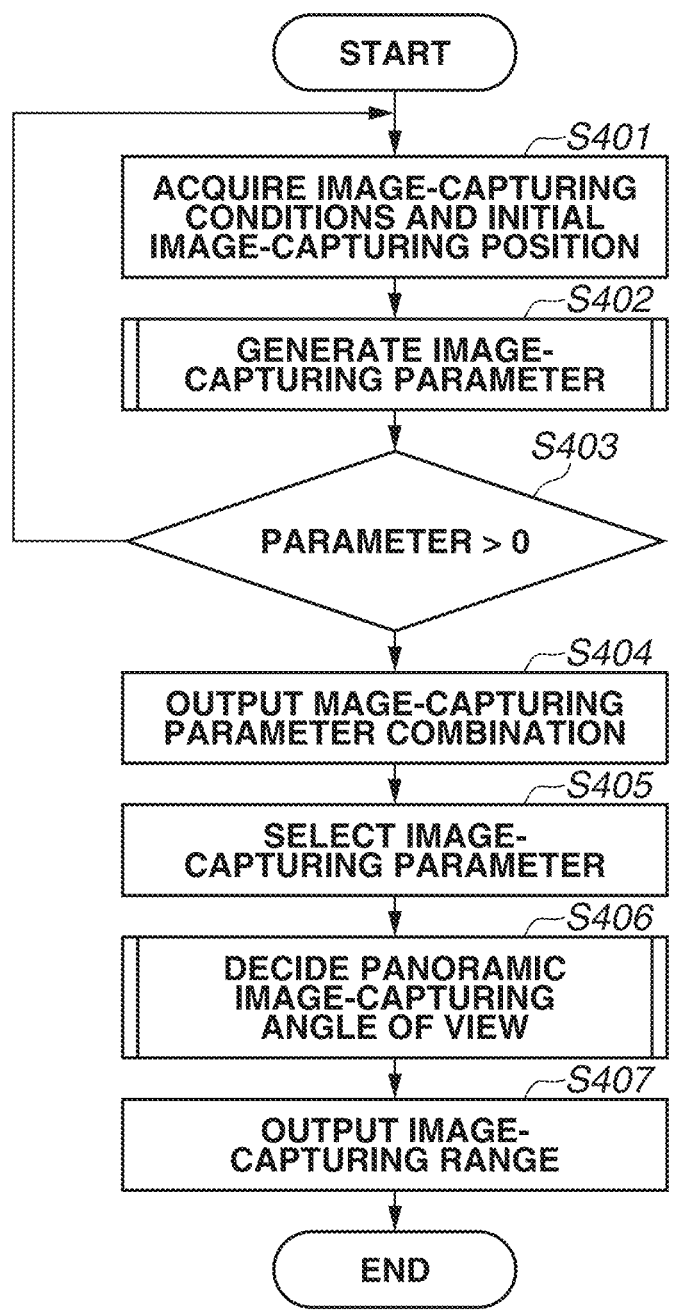
FIG. 4 is a flowchart illustrating an example of main processing to be executed by the information processing apparatus 100.

FIG. 4 is a flowchart illustrating an example of main processing executed by the information processing apparatus 100 in the present exemplary embodiment. In the present exemplary embodiment, when the panoramic image capturing support system is activated in the information processing apparatus 100, the screen 300 illustrated in FIG. 3 appears, and the processing in the flowchart in FIG. 4 starts. The various kinds of information input in the screen 300 are initialized, or input information previously saved based on an instruction by the user is read in as the initial values. In the following, each process (step) will be described attached with a character S at the head of the reference numeral of each of the step.

In step S401, the acquisition unit 210 acquires information about the image-capturing conditions input in the screen 300 by the user, in response to the designation of the set button 314. The acquired image-capturing conditions include at least information about the object, information about the positional relationship between the object and the imaging apparatus, information about the imaging apparatus, and information indicating the condition of the necessary resolution.

In step S402, the parameter decision unit 211 decides the image-capturing parameter to bring the entire object into focus in the panoramic image capturing, based on the image-capturing conditions and the image-capturing position. The decided image-capturing parameter is stored in a table illustrated in FIG. 6. FIG. 6 illustrates an example of data to be generated in the panoramic image capturing support system according to the present exemplary embodiment, and is a table storing the image-capturing parameter decided based on the image-capturing conditions. In the present exemplary embodiment, the image-capturing parameter is a combination of the focal distance and the F-number, and each record in the table in FIG. 6 represents this combination. Information representing an ID assigned to uniquely identify the image-capturing parameter is stored in a column 601. The focal distance f (mm), which is a component of the image-capturing parameter, is stored in a column 602, and the value of the aperture (F-number) is stored in the column 603. The processing performed in step S402 will be described in detail below with reference to a flowchart in FIG. 5A. The parameter decision unit 211 stores the generated table in the RAM 203. The focus range may be limited to a part of the object, instead of being the entire object. In this case, the part of the object is designated beforehand as an image-capturing target on the area 304.

In step S403, the parameter decision unit 211 determines whether at least one image-capturing parameter (one set) is decided by the processing in step S402. If at least one image-capturing parameter is decided, the processing proceeds to step S404. If the image-capturing parameter is not decided, the user is prompted to reset the image-capturing conditions, and the processing returns to step S401.

In step S404, the output unit 214 outputs the image-capturing parameter combination decided by updating the screen 300 referring to the table held in the RAM 203. In the present exemplary embodiment, the item 312 and the item 313 in FIG. 3 are displayed anew or updated. According to the table illustrated in FIG. 6, there are such combinations that the F-number is 4 to 11 when the focal distance is 24 (mm), the F-number is 5.6 to 11 when the focal distance is 35 (mm), the F-number is 8 to 11 when the focal distance is 50 (mm), and the F-number is 11 when the focal distance is 70 (mm). In the example illustrated in FIG. 3, the knob 309 is at the position for selecting the focal distance of 35 (mm), and thereby the item 313 surrounds the F-number of 5.6 to 11 which corresponds to the focal distance of 35. Meanwhile, the knob 310 is at the position for selecting the F-number of 11, and thereby the item 312 surrounds the corresponding focal distance of 24 to 70 (mm). For example, in a case where the knob 309 is moved by a user operation and the focal distance of 24 (mm) is selected, the item 313 changes to surround the F-number of 4 to 11.

As to which one of the one or more image-capturing parameters generated in step S402 is to be selected for the initial values (the positions of the knob 309 and the knob 310 immediately after step S404 is executed) to be set in the sliders, for example, the combination of the smallest focal distance and F-number is selected. Further, for example, the combination of the largest focal distance and F-number may be selected, and the combination of the averages thereof may be selected. Furthermore, in a case where an appropriate range of F-numbers is known from experience to avoid an influence on image quality due to an excessive aperture, such as spherical aberration and small aperture blur, an F-number recommended thereby may be selected for the initial value.

In step S405, the selection unit 212 selects the image-capturing parameter specified by a user operation, from the image-capturing parameters decided by the decision unit 211. In the case of the present exemplary embodiment, each time the position of the knob 309 or the knob 310 is updated, the image-capturing parameter is selected based on the position. Selecting the image-capturing parameter corresponds to determining one record identified by one ID from the table in illustrated in FIG. 6.

In step S406, the angle-of-view decision unit 213 decides the panoramic image-capturing angle of view, based on the acquired image-capturing conditions and image-capturing position, and the image-capturing parameter selected in step S405. The processing executed in step S406 will be described in detail below with reference to a flowchart in FIG. 5B. In step S407, the output unit 214 outputs the panoramic image-capturing angle of view decided by the angle-of-view decision unit 213. Specifically, the item 308 in the screen 300 is displayed anew, or updated.

Figure 5A:
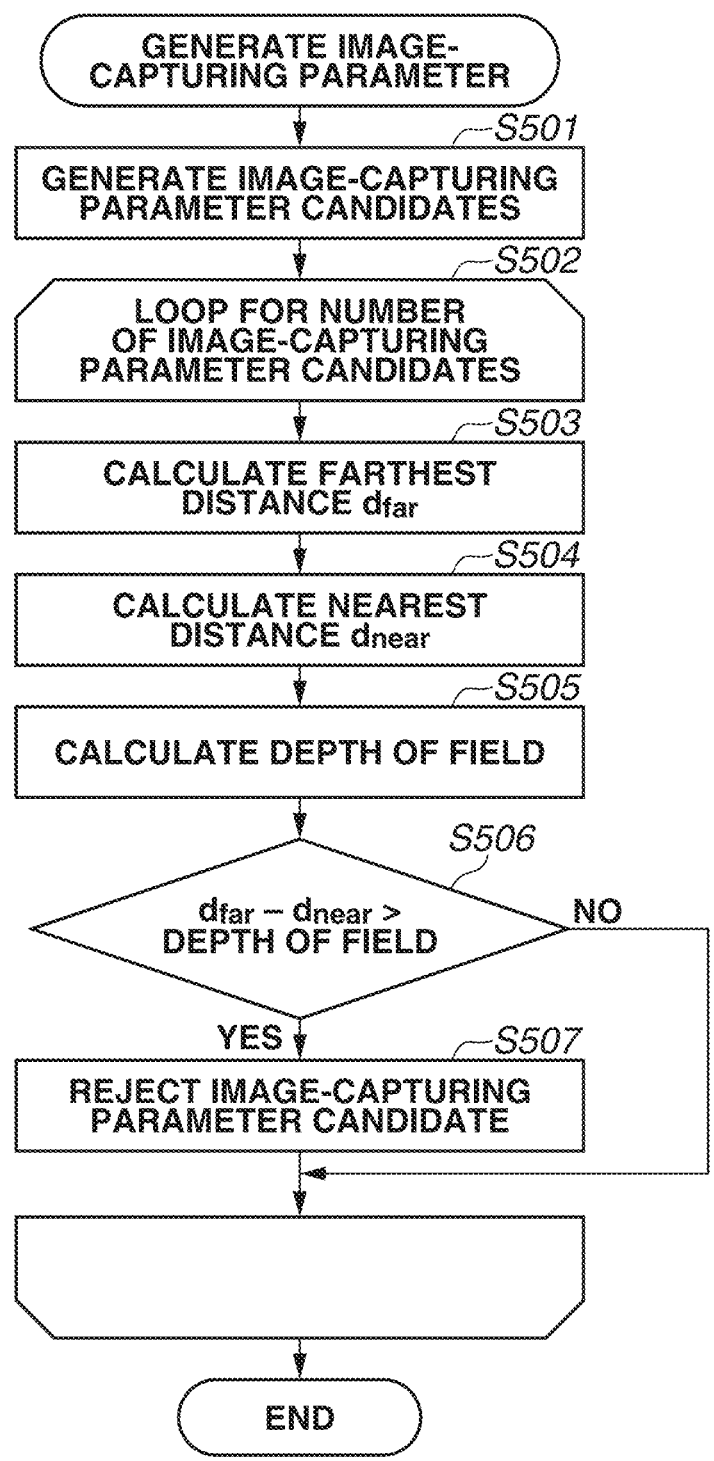
FIG. 5A is a flowchart illustrating an example of processing to be executed by the information processing apparatus 100.

FIG. 5A is a flowchart illustrating the processing of generating the image-capturing parameter, executed by the parameter decision unit 211 in step S402. In S501, the parameter decision unit 211 determines the ranges of the focal distance and the F-number from the image-capturing conditions (the camera model and the lens type input by the user in the present exemplary embodiment), and generates the combinations of the focal distance and the F-number. However, combinations generated at the timing of step S501 are possible comprehensive combinations generated from the image-capturing conditions input by the user, and the generated combinations do not necessarily enable image capturing for obtaining the resolution necessary for the user. The combinations generated in S501 will therefore be hereinafter referred to as image-capturing parameter candidates. The image-capturing parameter candidates are stored in the table illustrated in FIG. 6. In step S502, control is performed to repeat steps S503 to S507 for the number of the image-capturing parameter candidates generated in step S501.

Figure 7A:
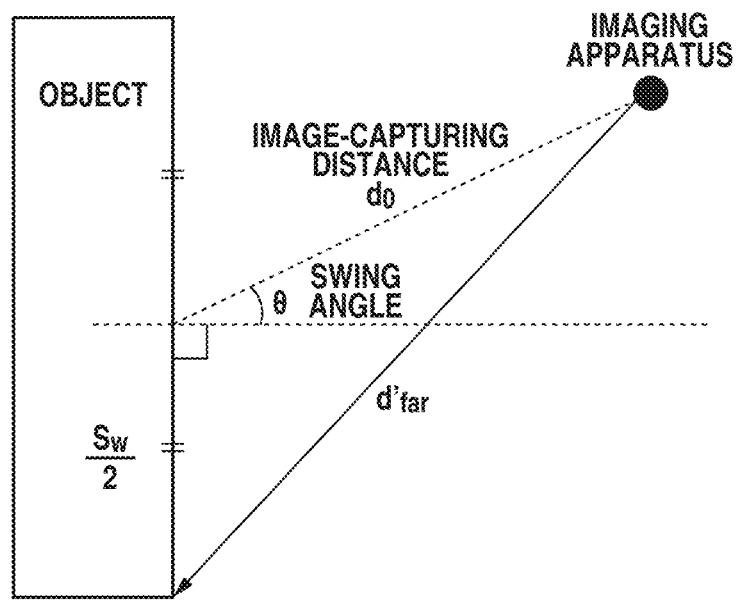
FIG. 7A schematically illustrates an example of the positional relationship between an object and an imaging apparatus.

In step S503, the parameter decision unit 211 calculates a distance $d_{far}$ from the imaging apparatus to a point farthest therefrom (hereinafter referred to as the farthest point) on the object plane. How $d_{far}$ is calculated is schematically illustrated in FIG. 7. FIG. 7A is a view of the object as viewed from above. In a case where the imaging apparatus is installed at a position corresponding to a tilt angle θ and a distance $d_0$ relative to the object plane, $d'_{far}$ illustrated in FIG. 7A is calculated as in formula (1):

$$d^i_{far} = \sqrt{d_o^2 + \left(\frac{Sw}{2}\right)^2 - 2d_o\frac{Sw}{2}\cos\left(\theta + \frac{\pi}{2}\right)}, \quad (1)$$

where $S_h$ is the height of the object plane, and $S_w$ is the width of the object plane.

Figure 7B:
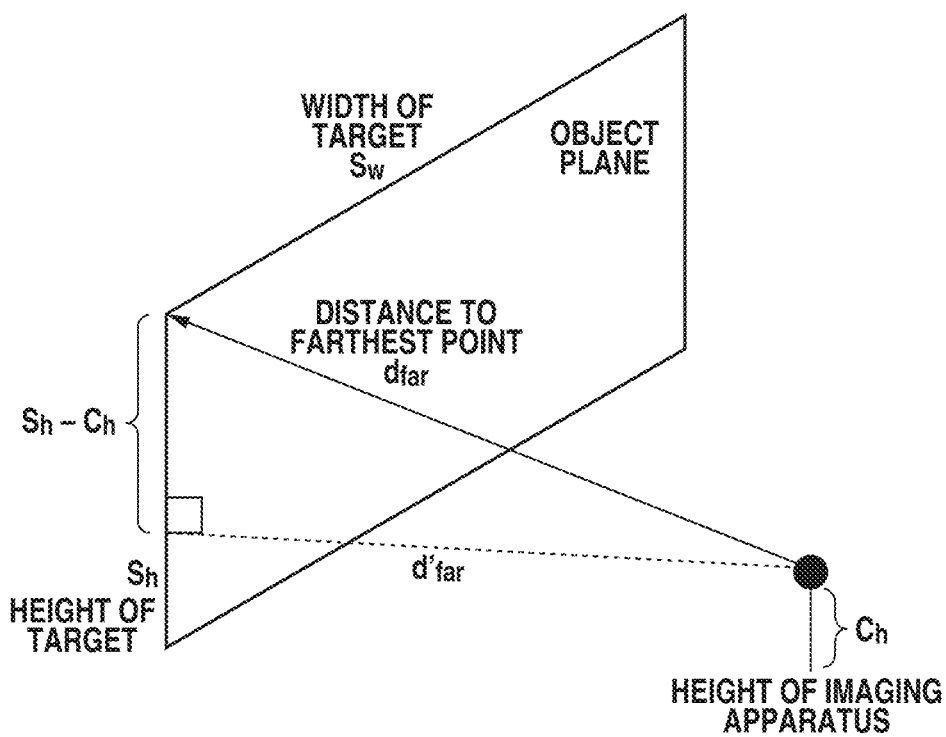
FIG. 7B schematically illustrates an example of the positional relationship between the object and the imaging apparatus.

FIG. 7B is a view of the object as viewed obliquely. $D_{far}$ illustrated in FIG. 7B is calculated as in Formula (2):

$$d_{far} = \sqrt{d'_{far}{}^2 + (S_h - C_h)^2} \quad (2)$$

where the height from the ground to the imaging apparatus is $C_h$.

Figure 8A:
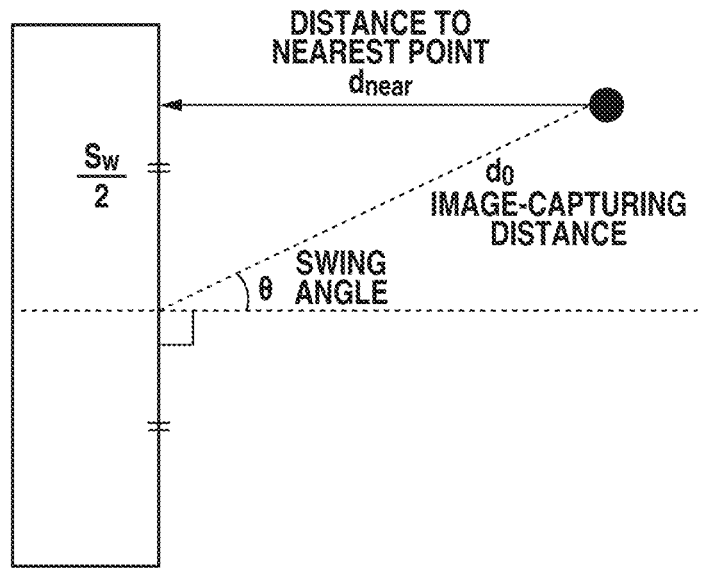
FIG. 8A schematically illustrates an example of the positional relationship between the object and the imaging apparatus.
Figure 8B:
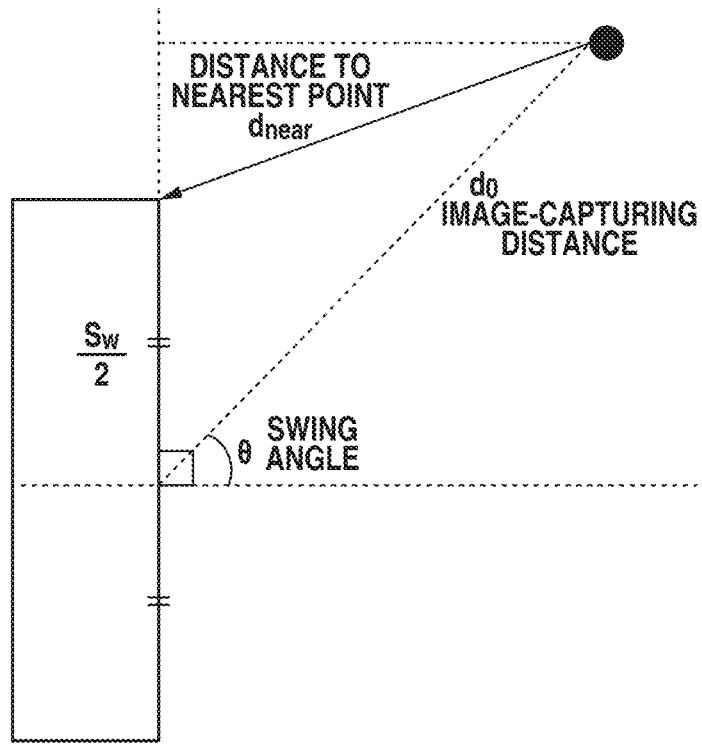
FIG. 8B schematically illustrates an example of the positional relationship between the object and the imaging apparatus.

In step S504, the parameter decision unit 211 calculates a distance $d_{near}$ from the imaging apparatus to a point nearest thereto (hereinafter referred to as the nearest point) on the object plane. How $d_{near}$ is calculated is schematically illustrated in FIG. 8. FIGS. 8A and 8B are views of the object as viewed from above. If the imaging apparatus is located in front of the object plane ($d_0 \sin θ ≤ S_w/2$), $d_{near}$ is calculated as in formula (3), as illustrated in FIG. 8A:

$$d_{near} = d_0 \cos θ \text{ if } d_0 \sin θ ≤ S_w/2 \quad (3).$$

In a case where the imaging apparatus is not in front of the object plane ($d_0 \sin θ > S_w/2$), $d_{near}$ is calculated as in formula (4), as illustrated in FIG. 8B:

$$d_{near} = \sqrt{d_o^2 + \left(\frac{Sw}{2}\right)^2 - 2d_o\frac{Sw}{2}\cos\left(\frac{\pi}{2} - \theta\right)} \text{ if } d_o \sin θ ≤ S_w/2. \quad (4)$$

In step S505, the parameter decision unit 211 determines a depth of field from, for example, the image-capturing parameter candidates. The depth of field consists of a front depth of field $D_n$ and a back depth of field $D_f$ that are calculated as in formula (5) and formula (6), respectively:

$$D_n = \frac{d^2 \delta F}{f^2 - d\delta F}, \quad (5)$$

$$D_f = \frac{d^2 \delta F}{f^2 - d\delta F}, \quad (6)$$

where d is a distance from the imaging apparatus to the object plane, and δ is a permissible circle of confusion diameter (a constant).

In step S506, the parameter decision unit 211 determines whether the panoramic image capturing of having the entire object in focus is possible when a certain image-capturing parameter candidate is adopted. Specifically, whether the difference between the farthest distance $d_{far}$ and the nearest distance $d_{near}$ falls within the depth of field calculated in S505 may be determined.

To use the depth of field most effectively, it is necessary to numerically calculate the distance d to the object to achieve the entire depth of field (back depth of field+front depth of field)>($d_{far}-d_{near}$), but the cost of such a calculation is high. In the present exemplary embodiment, relationship $d=d_{far}$ or $d=d_{near}$ is therefore used to reduce the calculation amount. In the case of the former, the determination criterion is whether ($d_{far}-d_{near}$) falls within the front depth of field $D_n$. In the case of the latter, the determination criterion is whether ($d_{far}-d_{near}$) falls within the back depth of field $D_f$. Such an image-capturing parameter rejection condition is expressed by formula (7):

$$\begin{cases} d_{far} - d_{near} > d_f & (d = d_{near}) \\ d_{far} - d_{near} > d_n & (d = d_{far}) \end{cases}. \quad (7)$$

In S507, the parameter decision unit 211 deletes the image-capturing parameter candidate not satisfying the condition of formula (7) in step S506 from the table illustrated in FIG. 6. As described above, all the image-capturing parameter candidates generated in step S501 are narrowed down using formula (7). Subsequently, the image-capturing parameter candidate remaining in the table in FIG. 6 is decided as the image-capturing parameter. The processing then proceeds to step S403 illustrated in FIG. 4.

Next, the processing of deciding the panoramic image-capturing angle of view (hereinafter expressed using φ) representing the image-capturing range, executed by the angle-of-view decision unit 213 in step S406, will be described with reference to FIG. 5B and FIG. 9. FIG. 5B is a flowchart illustrating an example of the processing of deciding the panoramic image-capturing angle of view φ. For simplification, both of a pan direction and a tilt direction are expressed by the identical panoramic image-capturing angle of view φ, as illustrated in a schematic diagram in FIG. 9A.

In step S511, the angle-of-view decision unit 213 initializes a provisional panoramic image-capturing angle of view φ'. Specifically, 0° is set as φ'. In step S512, a perpendicular line is dropped from the imaging apparatus to the object plane, and a perpendicular line length $d_p$ is calculated. Here, in a case where the imaging apparatus is not present in front of the object plane, a plane including the object plane is expanded to the front of the imaging apparatus, and the length $d_p$ of a perpendicular line dropped to the expanded plane is calculated. In step S513, the angle-of-view decision unit 213 temporarily stores the provisional panoramic image-capturing angle of view φ'. In step S514, a small angle δφ is added to the provisional panoramic image-capturing angle of view φ', and the provisional panoramic image-capturing angle of view Φ' is thereby expanded.

Figure 9B:
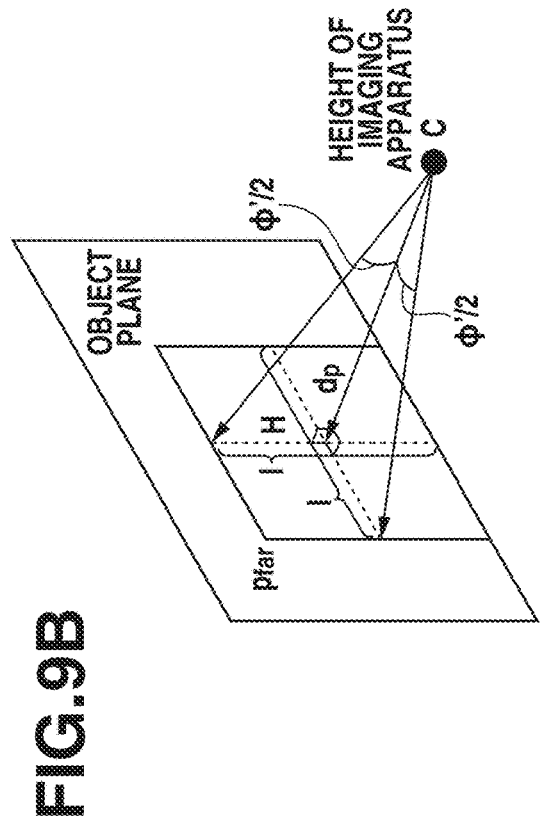
FIG. 9B schematically illustrates an example of the positional relationship between the object and the imaging apparatus.
Figure 9D:
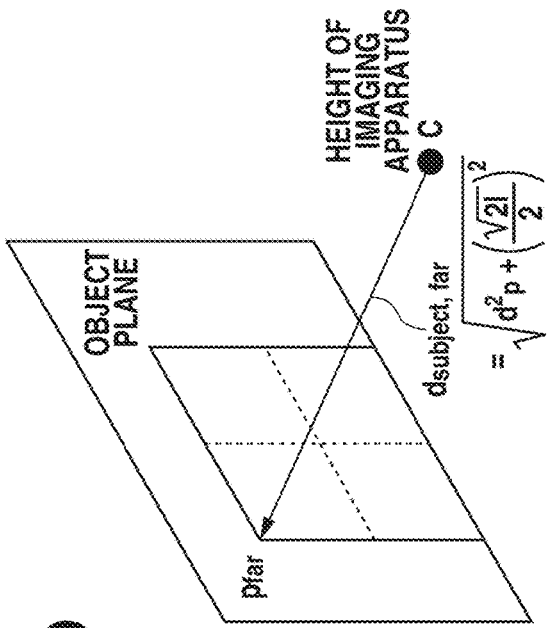
FIG. 9D schematically illustrates an example of the positional relationship between the object and the imaging apparatus.
Figure 9A:
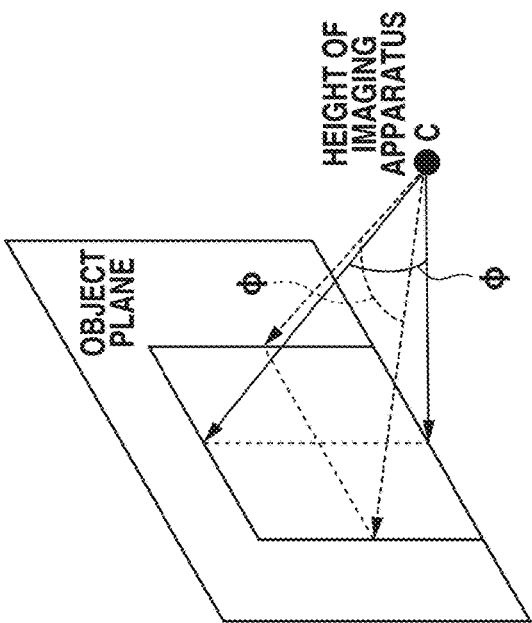
FIG. 9A schematically illustrates an example of the positional relationship between the object and the imaging apparatus.
Figure 9C:
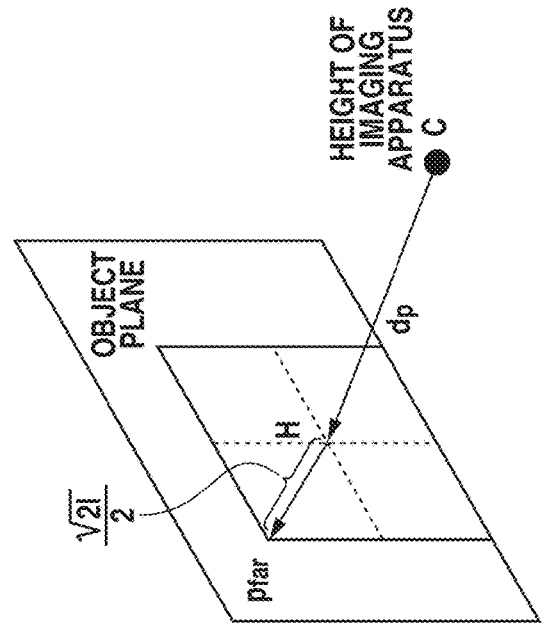
FIG. 9C schematically illustrates an example of the positional relationship between the object and the imaging apparatus.

In step S515, the angle-of-view decision unit 213 calculates a distance $d_{subject,far}$ from the imaging apparatus to the farthest point on the image-capturing range, for the image-capturing range in a case where the panoramic image capturing is to be performed using the provisional panoramic image-capturing angle of view φ'. In the present exemplary embodiment, the provisional panoramic image-capturing angle of view has an expansion at the angle φ' in both the pan direction and the tilt direction, and thus the farthest point $p_{far}$ on the image-capturing range is each vertex of the image-capturing range. First, ½, i.e., a half-length, of each of the width and height of the image-capturing range is calculated as illustrated in FIG. 9B. Next, a magnitude $d_p$ of a vector connecting a foot H of the perpendicular line and the farthest point $p_{far}$ is calculated as illustrated in FIG. 9C. Finally, the distance $d_{subject, far}$ from the imaging apparatus to the farthest point on the image-capturing range is determined, as illustrated in FIG. 9D. The distance $d_{subject, far}$ can be determined by the Pythagorean theorem using the magnitude of $d_p$, and the magnitude of the vector connecting the foot H of the perpendicular line and the farthest point $p_{far}$.

In step S516, the angle-of-view decision unit 213 calculates a resolution r (px/mm) at the farthest point on the image-capturing range. The following relational expression is true:

$$S_{subject} \cdot d_{subject} = S_{sensor} \cdot f,$$

where $S_{subject}$ is the size of the object plane appearing in the captured image, $d_{subject}$ is the distance from the imaging apparatus to the object plane, and $S_{sensor}$ is the sensor size is.

The size $S_{subject}$ of the object plane appearing in the captured image is expressed by a size $S_{image}$/resolution r (px/mm) of the captured image, and thus the above-described relational expression is rewritten as follows:

$$S_{image}/r \cdot d_{subject} = S_{sensor} \cdot f$$

The above-described relational formula is arranged for the resolution r:

$$r(px/\text{mm}) = \frac{r \cdot S_{image}}{d_{subject} \cdot S_{someone}}. \tag{8}$$

The sensor size $S_{sensor}$ and the captured image size $S_{image}$ are known from the image-capturing conditions, and the focal distance f is known from the image-capturing parameter. Whereby, a resolution $r_{far}$ at the farthest point on the image-capturing range from the imaging apparatus is calculated by substituting the distance $d_{subject, far}$ from the imaging apparatus to the farthest point on the image-capturing range calculated in step S514 into $d_{subject}$ of formula (8).

In step S517, the angle-of-view decision unit 213 compares the resolution (px/mm) necessary for the user and acquired in step S401, and the resolution r determined in step S516. In a case where the resolution r is smaller than the necessary resolution, it means that the panoramic image capturing meeting the resolution necessary for the user is possible in the entire image-capturing range. In other words, a wider image-capturing range can be secured. In this case, the processing returns to step S513 to expand the panoramic image-capturing angle of view. Otherwise, it means that an area not meeting the resolution necessary for the user is included in the image-capturing range. In S518, the provisional panoramic image-capturing angle of view φ' stored last in step S513 is therefore extracted and decided as the panoramic image-capturing angle of view φ. In step S407, based on the decided panoramic image-capturing angle of view φ, the image-capturing range is determined on the area 304 and displayed as the item 308 on the screen 300.

The user can confirm the screen 300 displayed by the above-described processing, and confirm the image-capturing parameter that enables capturing of a panoramic image having the necessary resolution. Specifically, the user actually make settings in the imaging apparatus 101, with reference to the image-capturing parameter indicated by the knob 309 and the knob 310, among the image-capturing parameters displayed in the area 305. Further, it is possible to recognize the range of an object plane imagable by the panoramic image capturing in a case where a certain image-capturing parameter is selected.

Further, it is also possible to set the range of the panoramic image capturing in the camera platform apparatus 102, by checking the panoramic image-capturing angle of view calculated in step S406. In this case, the convenience further increases if the panoramic image-capturing angle of view calculated in step S406 is presented to the user also as numerical information that can be input into the camera platform apparatus 102. The user can confirm the numerical value, and set the range of the panoramic image capturing as an angle. The image-capturing parameter decided by the information processing apparatus 100 may be automatically set in the imaging apparatus 101, and the panoramic image-capturing angle of view decided by the information processing apparatus 100 may be automatically set in the camera platform apparatus 102. In this process, the panoramic image-capturing angle of view is expressed by a pan angle and a tilt angle, and set in the camera platform apparatus 102 as settings about the range of the panoramic image capturing. The camera platform apparatus may be mounted on a self-propelled carriage, drone, or the like, and the position and direction of each of the imaging apparatus and the camera platform apparatus may be automatically set by inputting the image-capturing position and the image-capturing direction input in the process illustrated in FIG. 4.

According to the present exemplary embodiment, the image-capturing range theoretically determined is visualized, so that the user can easily decide the image-capturing parameter and select the image-capturing equipment, in order to image as wide range as possible from one image-capturing position. Moreover, it is also possible to perform an operation of reselecting the image-capturing parameter after the image-capturing range is visualized. In this case, the processing in and after step S406 illustrated in FIG. 4 is executed again, and the image-capturing range based on the reselected image-capturing parameter is visualized.

Furthermore, various kinds of information to be used as reference when the image-capturing parameter is selected in step S405 or when the image-capturing parameter is reselected may be displayed. In the case of the screen 300 illustrated in FIG. 3 in the present exemplary embodiment, the area 311 is reference information for the selection of the image-capturing parameter, consisting of the total number of images to be captured in one panoramic image capturing, and the maximum resolution as well as the minimum resolution in the panoramic image capturing. Each time the user moves the knob of the slider to reselect the image-capturing parameter, the reference information is recalculated, and the user can thereby select the image-capturing parameter based on the reference information. For example, it is possible to make a selection to set as few shots as possible, or a selection to reduce the difference between the resolutions.

In the present exemplary embodiment, the two-dimensional drawing, map, aerial photograph, or the like is displayed in the area 304, but a content equivalent thereto may be displayed in three dimensions. In that case, it is necessary to set at least an appropriate scale in a three-dimensional space, and place a three-dimensional model of a structure to be the object. Visualizing the image-capturing range on the three-dimensional model enables the user to confirm the image-capturing range intuitively.

As described above, according to the present exemplary embodiment, the user can easily set appropriate parameters to obtain an image having a necessary resolution, in a case where a structure is imaged by the panoramic image capturing in a setting environment where tilt is easily involved. For example, there is no need to make an effort, such as changing various conditions and parameters to perform image capturing again because a necessary resolution is not achieved at a stage of applying image processing after image capturing. The work for imaging a surface of a large structure with a high resolution is streamlined, and thus, in particular, the inspection work utilizing the processing of detecting a deformation occurring in a structure by image analysis becomes made easy.

Second Exemplary Embodiment

In the first exemplary embodiment, the image-capturing parameter and the panoramic image-capturing angle of view that are suitable for the panoramic image capturing to be performed from the image-capturing position are calculated, based on the image-capturing conditions input by the user, and the image-capturing position set in the initial state. In contrast, in a second exemplary embodiment, another image-capturing position suitable for image capturing is presented as user support information, based on image-capturing conditions input by a user, and an image-capturing position set in the initial state. For example, there is a case where the entire object plane is not included in a panoramic image-capturing angle of view (an image-capturing range) decided based on the image-capturing position set in the initial state, such as a case where an object is a huge structure. In other words, there is a case where the entire object plane cannot be imaged in one time of panoramic image capturing. In the second exemplary embodiment, an image-capturing position suitable for the second and subsequent image capturing can be presented as the user support information, in a case where it is anticipated that the object cannot be imaged in one panoramic image capturing and the panoramic image capturing is performed a plurality of times. The second and subsequent panoramic image capturing will be hereinafter referred to as an additional image capturing.

Figure 10A:
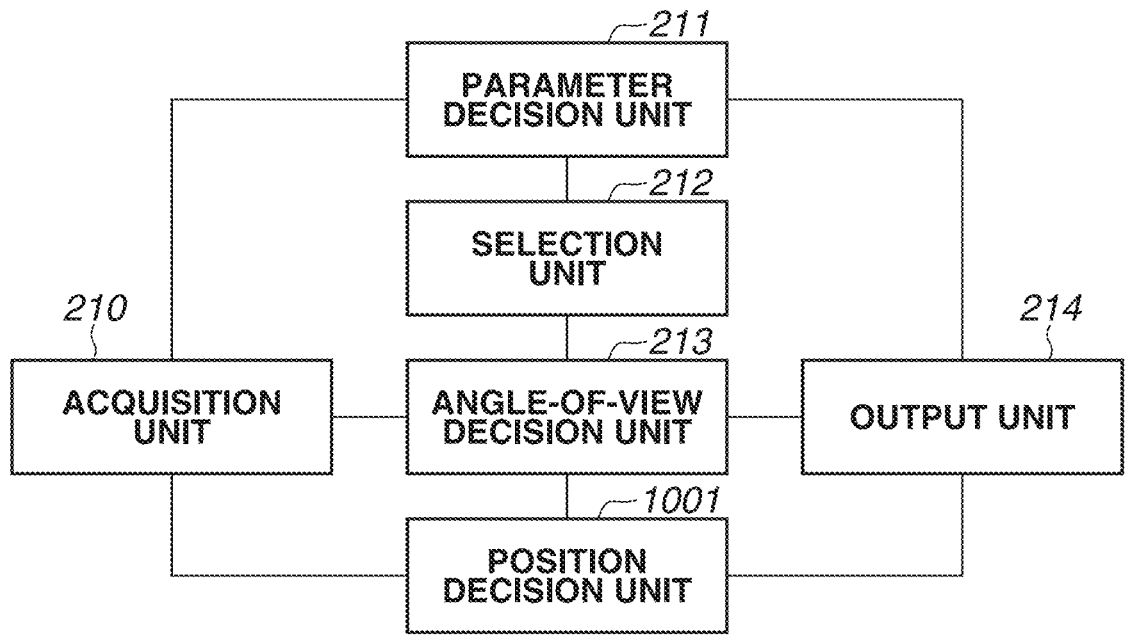
FIG. 10A is a diagram illustrating an example of a functional configuration of the information processing apparatus 100.

The second exemplary embodiment can be executed by an information processing apparatus 100 having the same hardware configuration as that of the first exemplary embodiment. FIG. 10A is a functional block diagram illustrating the information processing apparatus 100 according to the second exemplary embodiment. The description of function units common to FIG. 2B described in the first exemplary embodiment will be omitted. A position decision unit 1001 decides the image-capturing position for each of the plurality of times of the additional image capturing. In the present exemplary embodiment, the decided image-capturing positions are generated in a form of a table, and held in a RAM 203. FIG. 11A is an example of data to be generated in a panoramic image capturing support system, and illustrates a table storing the image-capturing positions of the additional image capturing. In a column 1101, an ID for uniquely identifying the additional image capturing is stored. In a column 1102, position information indicating the image-capturing position for the additional image capturing is defined. In the present exemplary embodiment, the position information is decided based on a coordinate system defined in an area 304. As with the first exemplary embodiment, the coordinate system defined in the area 304 conforms to source information, such as a drawing read in to set the area 304.

Main processing performed in the second exemplary embodiment is executed along the flowchart illustrated in FIG. 4 as with the first exemplary embodiment, and thus the description thereof will be omitted here. In the second exemplary embodiment, the position decision unit 1001 starts processing of a flowchart in FIG. 12, at a stage where the image-capturing range is output in the flowchart in FIG. 4.

In the present exemplary embodiment, each image-capturing position for the additional image capturing is determined by performing parallel shift (hereinafter referred to as a shift) of the image-capturing position in the width direction of the object. The amount of the shift is determined based on the width of the image-capturing range calculated in the first exemplary embodiment.

In step S1201, the position decision unit 1001 calculates a shift amount T (m) of the image-capturing position. The shift amount T (m) is calculated as in formula (9):

$$T = (1 - R_o) l_w \qquad (9),$$

where $R_o$ is the overlap rate of an overlap with the adjacent image-capturing range, and $l_w$ is the width of the image-capturing range.

Figure 13:
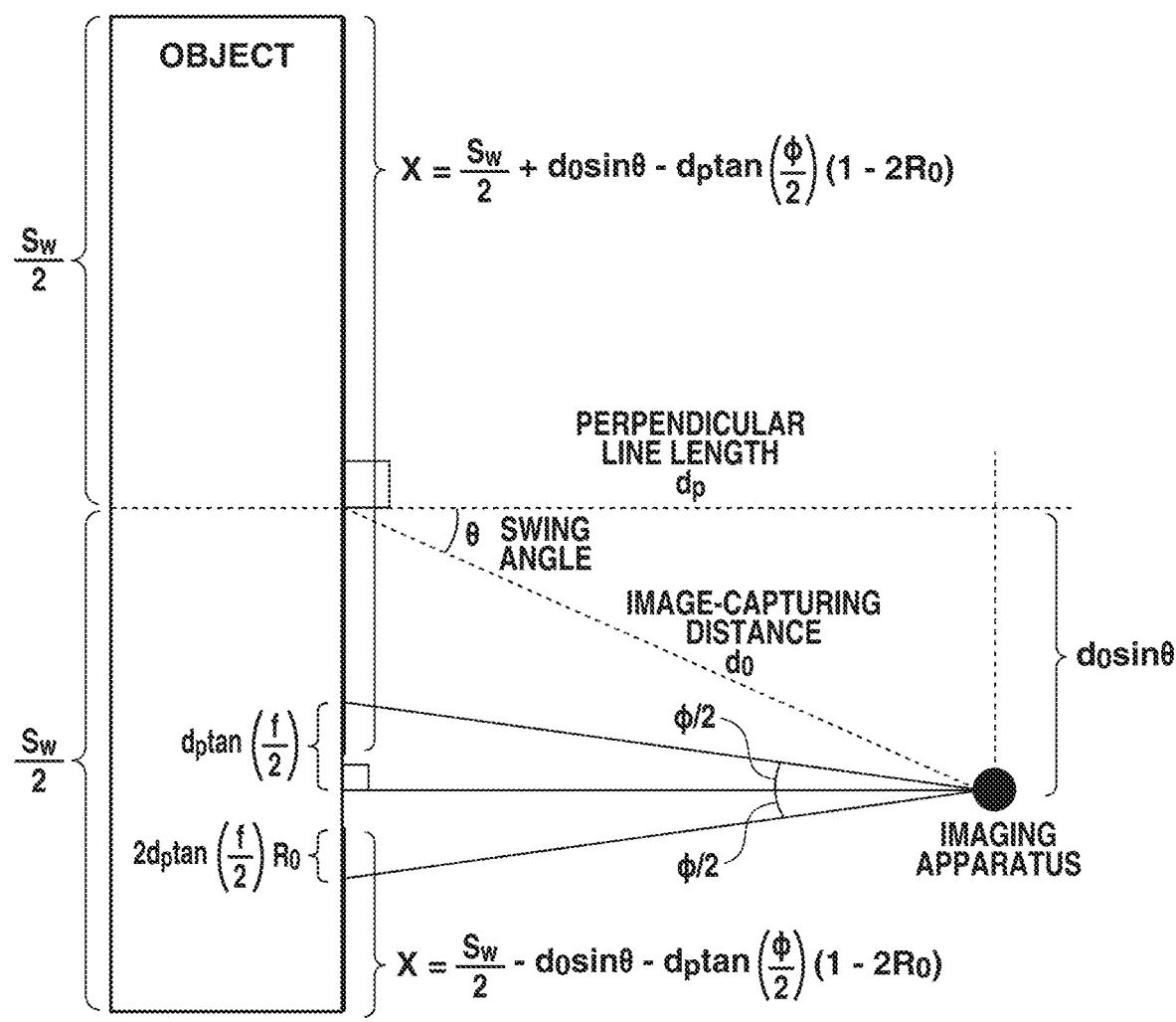
FIG. 13 is a diagram schematically illustrating an example of the positional relationship between an object and an imaging apparatus.

In step S1202, the position decision unit 1001 calculates how many times a shift can be performed to each of the left and right from the current image-capturing position. First, there is calculated a length X of a non-image-capturing area in each of the left and right of the image-capturing range in a case where the panoramic image capturing is performed from the initial position. FIG. 13 schematically illustrates how the length X is calculated based on the positional relationship between the object and an imaging apparatus. As illustrated in FIG. 13, the size of the non-image-capturing area on the left side can be determined using formula (10), and the size of the non-image-capturing area on the right side can be determined using formula (11), in a case where the initial image-capturing position is located on the left from the center of the object plane. In a case where the initial position is located on the right side from the center of the object plane, the formulas for the left and right replace each other.

$$X = \frac{5w}{2} + d_o \sin\theta - d_p \tan\left(\frac{\phi}{2}\right)(1 - 2R_o) \qquad (10)$$

$$X = \frac{Sw}{2} + d_o \sin\theta - d_p \tan\left(\frac{\phi}{2}\right)(1 - 2R_o) \qquad (11)$$

Next, the number of shifts that can be performed in each of the left and right is calculated by dividing the length of the non-image-capturing area by the length of the image-capturing range. Note that the overlap rate of the image-capturing range is considered in this process. The number of shifts is determined as in formula (12). A ceil function is a function that returns the smallest integer of x or larger to an argument x.

$$\text{Number of shifts} = \text{ceil}\left(\frac{X - l_w}{(1 - R_o) l_w}\right) + 1 \qquad (12)$$

In step S1203, the position decision unit 1001 sets the initial value of the direction of the shift. Here, the initial value of the shift direction is set to the left-hand direction of the imaging apparatus. The shift may start with the right-hand direction.

In step S1204, control is performed to execute step S1205 described below for the number of shifts in the current shift direction, here, the left-hand direction of the imaging apparatus. In step S1205, the image-capturing position is moved in the current shift direction by the shift amount calculated in step S1201. Afterwards, the image-capturing position after the shift is recorded in the table in FIG. 11A as the image-capturing position for the additional image capturing. In step S1206, the shift amount is set to zero and the position returns to the initial image-capturing position. In step S1207, the shift direction calculated in step S1203 is inverted.

In step S1208, control is performed to execute step S1209 described below for the number of shifts in the current shift direction, here, the right-hand direction of the imaging apparatus. In step S1209, the image-capturing position is moved in the current shift direction by the shift amount calculated in step S1201. Afterwards, the image-capturing position after the shift is recorded in the table in FIG. 11A as the image-capturing position for the additional image capturing. In step S1210, the position decision unit 1001 displays the image-capturing position for the additional image capturing stored in the table in FIG. 11A, on the area 304. In the present exemplary embodiment, a panoramic image-capturing angle of view similar to that calculated in the first exemplary embodiment is used for a panoramic image-capturing angle of view representing the image-capturing range of the additional image capturing. The panoramic image-capturing angle of view calculated in the first exemplary embodiment is therefore used when the image-capturing range for the additional image capturing is visualized. Since only the parallel shift in the width direction of the object and no change in the distance from the imaging apparatus (a lens) to the object are preconditions, the object plane is included in a depth of field in the image capturing performed based on the same image-capturing parameter as that at the initial position, at the image-capturing position after the shift.

Figure 14:
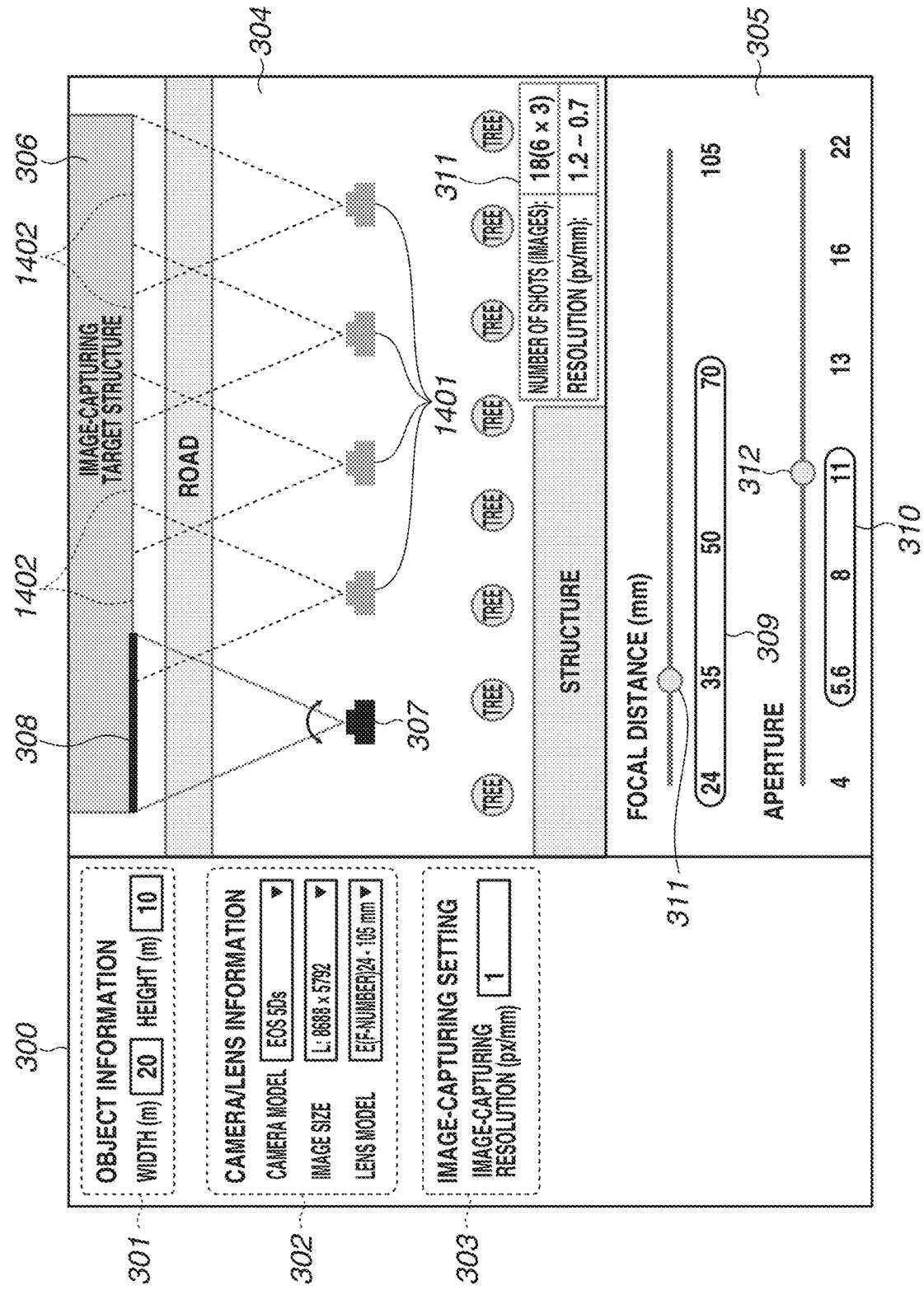
FIG. 14 is a diagram illustrating an example of a user interface of the panoramic image capturing support system.

FIG. 14 is a diagram illustrating an example of a screen 300 in a case where the image-capturing position and the image-capturing range of the additional image capturing are visualized on the area 304. Items 1401 each represent the image-capturing position for the additional image capturing, and items 1402 each represent the image-capturing range for the additional image capturing. However, the image-capturing range represented by the item 1402 illustrated in FIG. 14 corresponds to each of the ranges of the surface of an image-capturing target structure included in the angle of view of the item 1401 at the corresponding image-capturing position. To clearly express each of the image-capturing ranges and an overlap thereof, a line segment, such as an item 308, may be distinguished and displayed by, for example, color coding.

According to the present exemplary embodiment, in a case where the entire object cannot be imaged in the image-capturing range determined based on the image-capturing position in the initial state designated by the user, the image-capturing position and the image-capturing range for the additional image capturing to be performed a plurality of times can be further determined and output. The user can execute the panoramic image capturing while checking the presented image-capturing position and image-capturing range beforehand or in real time, and thereby efforts of trial and rework on the image-capturing site are reduced. The work for imaging a surface of a large structure with a high resolution is streamlined, and thus, in particular, the inspection work utilizing the processing of detecting a deformation occurring in a structure by image analysis is made easy.

Figure 12:
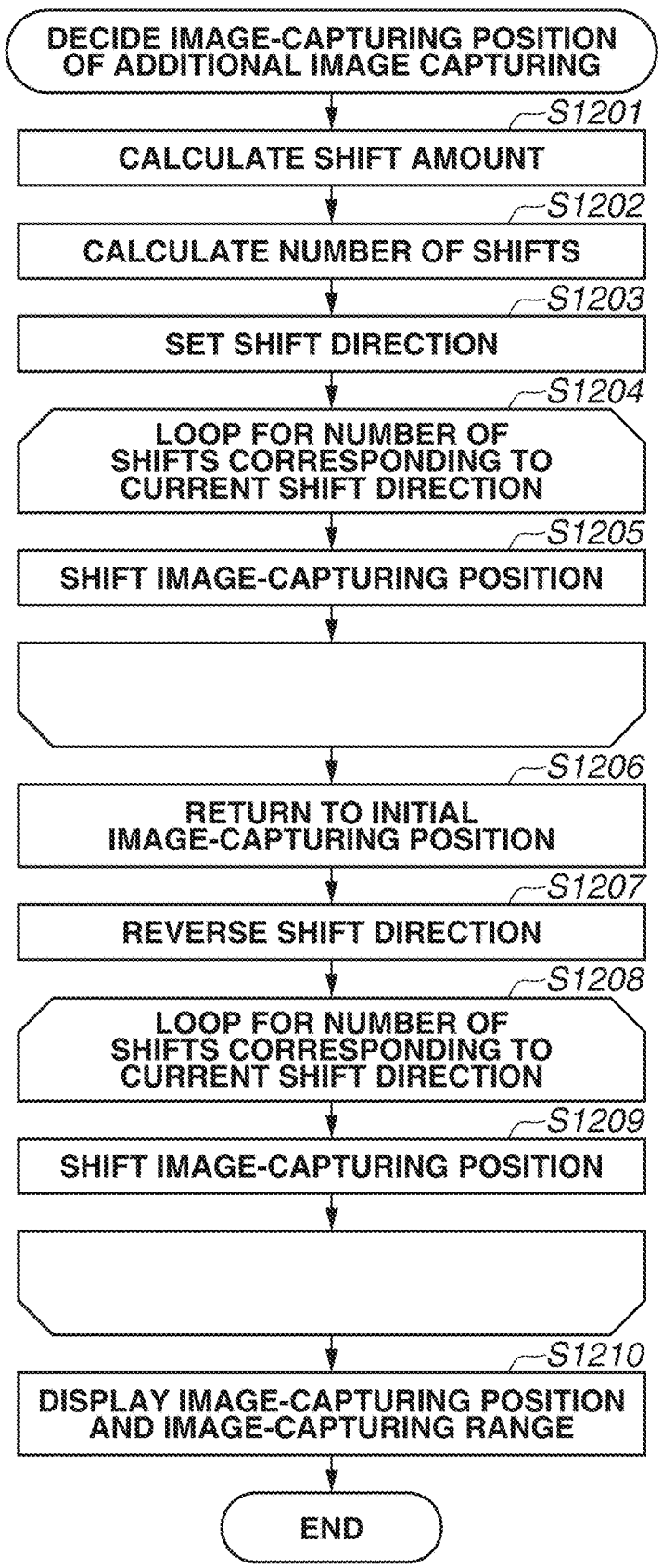
FIG. 12 is a flowchart illustrating an example of processing to be executed by the information processing apparatus 100.

In a case where the information designated as the image-capturing position in the initial state is updated by a user input, the image-capturing position for the additional image capturing may also be updated along with the update of the information in real time. In this case, the processing illustrated in FIG. 12 is executed at every update of the initial image-capturing position, the image-capturing position for each additional image capturing is recalculated, and the display on the area 304 is updated.

The image-capturing position in the initial state is a position to be designated by the user who understands the situation of the on-site where the panoramic image-capturing is to be performed, as a position where the panoramic image capturing system illustrated in FIG. 1 can be installed. In other words, the second exemplary embodiment enables the system to propose another image-capturing position, in response to the input, from the user, of information about a position where the imaging apparatus can be realistically installed. In the second exemplary embodiment, steps S402 to S405 of the flowchart illustrated in FIG. 4 may be omitted, and the image-capturing parameter designated by the user as part of the image-capturing conditions to be initially set may be received in substitute processing, accordingly. Alternatively, step S404 may be omitted, and the most appropriate image-capturing parameter combination may be automatically selected in step S405. Even if such a modification is made, according to the second exemplary embodiment, the user can execute the panoramic image capturing after confirming the presented image-capturing position and image-capturing range, and thus efforts of trial and rework on the image-capturing site are reduced.

The image-capturing position in the initial state is not limited to the method of designating one image-capturing position in the area 304, and a method of designation using, for example, a range deemed to enable the installation of the imaging apparatus in view of the actual situation, may be adopted. In this case, for example, a rule for determining the first image-capturing position from the designated range (e.g., a point where the X coordinate and the Y coordinate are smallest) is prepared beforehand, and series of processes is performed assuming that this position is the image-capturing position in the initial state. Further, for example, a rule for determining a plurality of candidates for the first image-capturing position within the designated range is prepared beforehand (e.g., all those included in the designated range among grid points in a grid into which the coordinate system in the area 304 is converted), and the series of processes is performed assuming that each of the positions is the image-capturing position in the initial state. Whether to adopt the first image-capturing position may be selected by the user, or a pattern in which the number of image-capturing times including the additional image capturing is the smallest may be determined and presented to the user.

<Modification>

Figure 15:
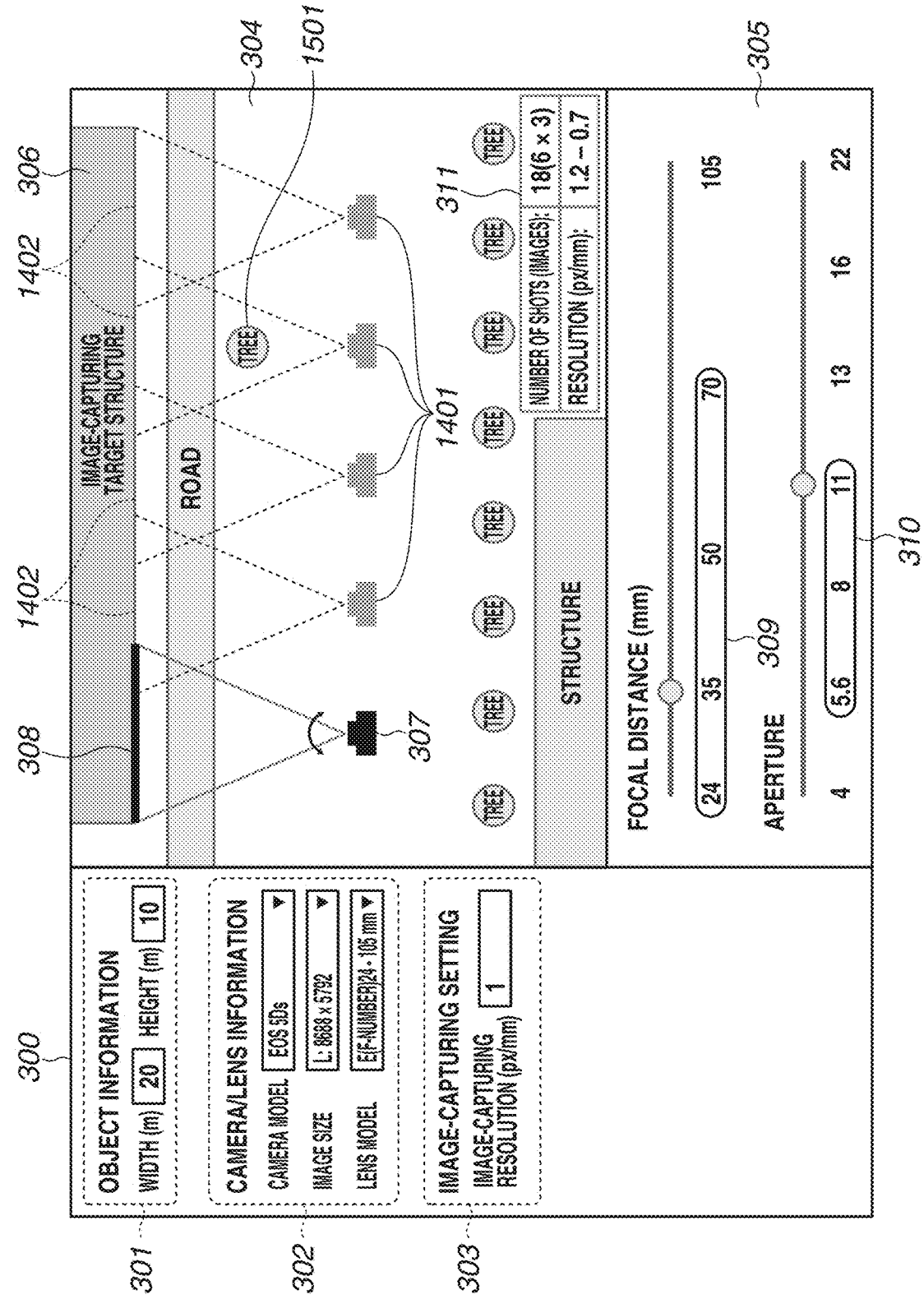
FIG. 15 is a diagram illustrating an example of a user interface of the panoramic image capturing support system.

In the second exemplary embodiment, based on the image-capturing position in the initial state designated by the user, the one or more image-capturing positions of the additional image capturing are determined, and presented to the user together with the corresponding image-capturing ranges. From here, as a modification of the second exemplary embodiment, there will be described a case where the image-capturing position to be presented can be adjusted by receiving an instruction from the user as to whether to use each of the presented image-capturing positions of the additional image capturing. For example, in a case where the panoramic image capturing is performed on an image-capturing site indicated in the area 304 in FIG. 15, an obstacle 1501 may be present between the object plane and one of the image-capturing positions for the additional image capturing. In this way, there is a case where the object is not necessarily imaged from each of the theoretically proposed image-capturing positions for the additional image capturing. In the modification, information about a position at which the imaging apparatus can be realistically installed is additionally acquired from the user who can be aware of the on-site situation in greater detail, and the information is reflected in the image-capturing position for the additional image capturing to be proposed.

In the modification, the user designates a position to be used in the panoramic image capturing, among the items 1401 as the image-capturing positions for the additional image-capturing calculated in the second exemplary embodiment. The image-capturing position designated by the user will be hereinafter referred to as "confirmed state". The designation of the confirmed state by the user is input by selecting any one of the items 1401 as the image-capturing positions using a pointing device, such as a mouse, or a touch panel. Next, the information processing apparatus 100 calculates a range, of the object plane, in which image capturing cannot be performed from the determined image-capturing position alone, and presents the calculated range to the user. The user then moves the unconfirmed item 1401 as the image-capturing position to a position where the range can be imaged. Finally, the information processing apparatus 100 executes processing of deciding an image-capturing range that can be imaged from the item 1401 as the image-capturing position moved by the user, for an area where the image-capturing is impossible on the object plane.

Processing in a case where the user has moved the image-capturing position for the additional image capturing will be described below. The processing of deciding the image-capturing range that can be imaged from the moved image-capturing position 1401 in the modification is based on the processing of deciding the image-capturing range that can be imaged from the initial image-capturing position designated by the user, the processing being executed in the first and second exemplary embodiments. In the following, the description of elements common to the first and second exemplary embodiments is omitted as appropriate, and the difference will be mainly described.

Figure 10B:
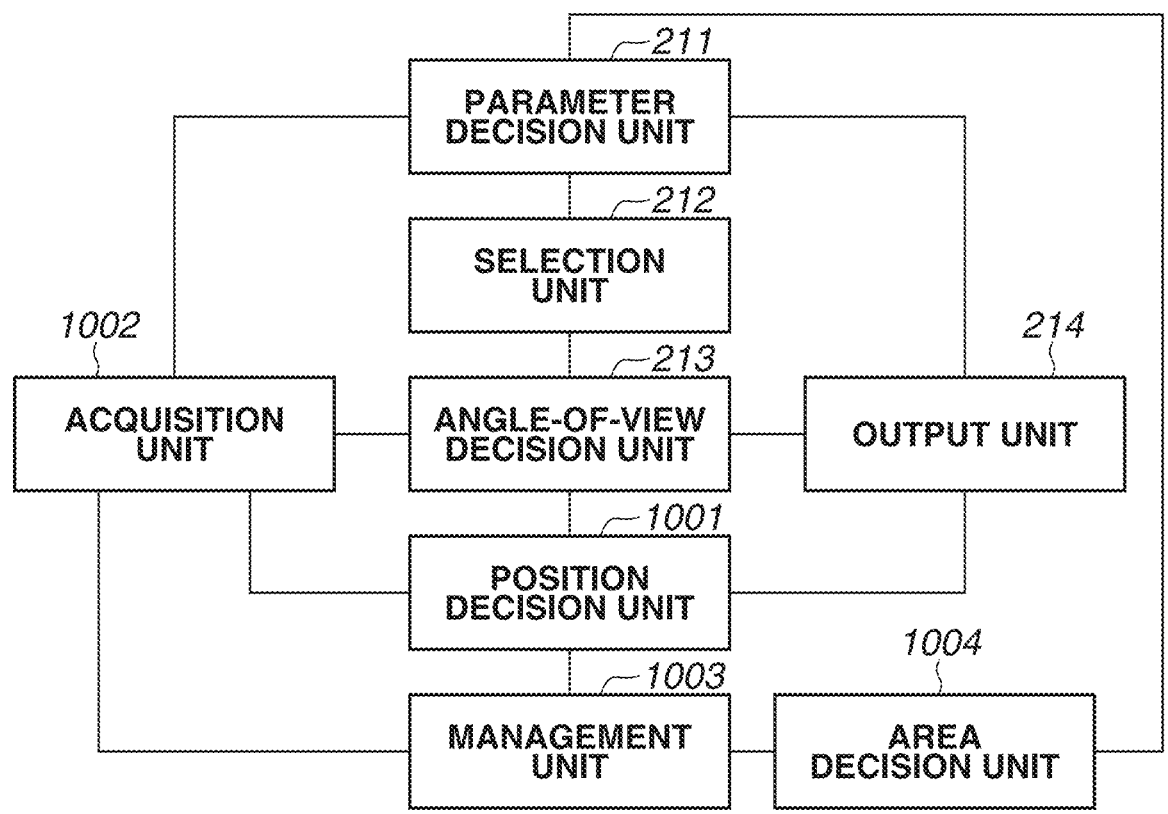
FIG. 10B is a diagram illustrating an example of a functional configuration of the information processing apparatus 100.

FIG. 10B is a functional block diagram illustrating the information processing apparatus 100 according to the modification. An acquisition unit 1002 of the modification acquires, in addition to the information about the image-capturing conditions and the initial image-capturing position, information input by an operation of designating any one of the items 1401 representing the image-capturing positions for the additional image capturing and an operation of updating the image-capturing position for the additional image capturing by the user.

A management unit 1003 manages the confirmed state/unconfirmed state of the image-capturing position for the additional image capturing decided by the position decision unit 1001. As with the second exemplary embodiment, the decided image-capturing positions are generated in the form of a table, and held in the RAM 203. FIG. 11B illustrates an example of the table storing the image-capturing positions for the additional image capturing in the modification. As with FIG. 11A, the ID of the additional image capturing is stored in the column 1101, and the coordinates of the image-capturing position is stored in the column 1102. In the table illustrated in FIG. 11B, information indicating the confirmation state of the additional image capturing of each record is stored in a column 1103. The confirmation state takes two values of "confirmed" and "unconfirmed", and all the confirmation states of the additional image capturing are "unconfirmed" in the initial state. When receiving a notification indicating that any one of the items 1401 is selected from the acquisition unit 1002, the management unit 1003 stores the corresponding additional image capturing as being in the confirmed state. Specifically, "confirmed" is set in the column 1103, for a record corresponding to the additional image capturing designated by the user operation, among the records representing the additional image capturing stored in table in FIG. 11B. An area decision unit 1004 determines an unconfirmed area, of the object plane, not to be imaged in the initial image capturing and the confirmed additional image capturing.

Figure 16:
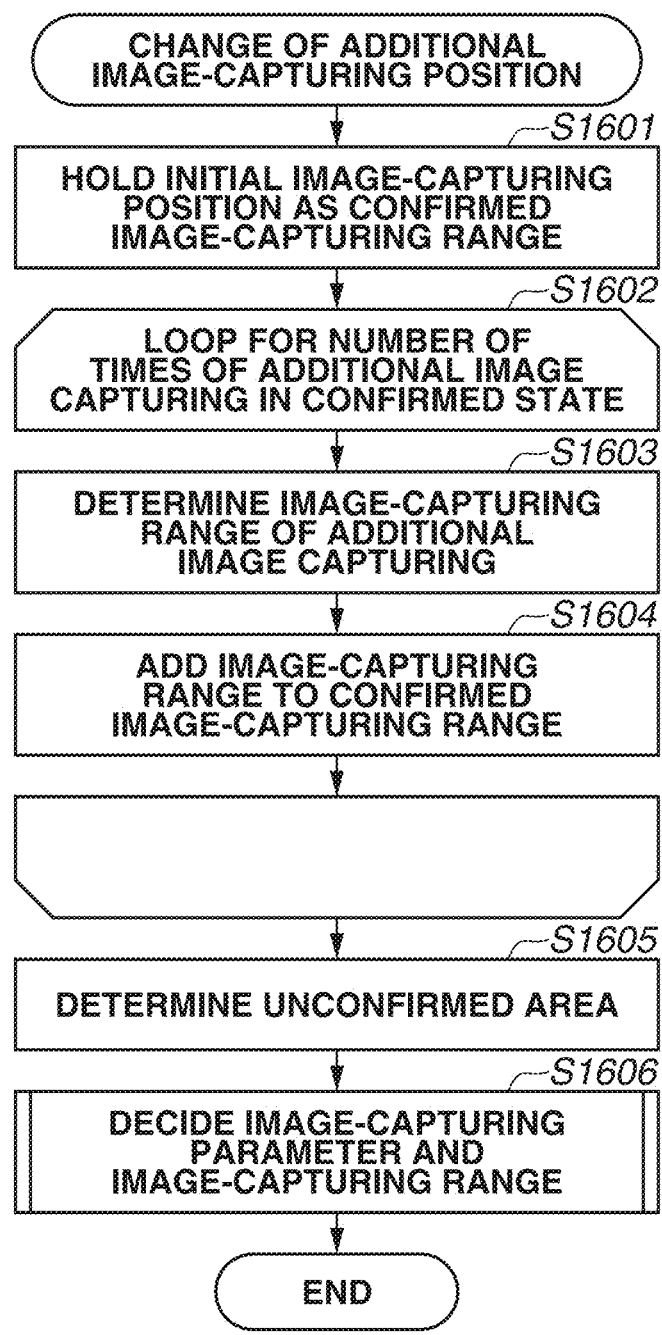
FIG. 16 is a flowchart illustrating an example of processing to be executed by the information processing apparatus 100.

FIG. 16 is a flowchart illustrating an example of the processing of deciding the unconfirmed area to be executed by the area decision unit 1004 in the modification. The processing is executed every time the confirmation state of the additional image capturing is changed by a user operation, after the main processing illustrated in the flowchart in FIG. 4, and the processing of deciding the image-capturing position for the additional image capturing illustrated in the flowchart in FIG. 12.

In step S1601, the area decision unit 1004 stores the image-capturing range (S406) decided based on the initial image-capturing position in the RAM 203, as a confirmed image-capturing range. The confirmed image-capturing range corresponds to an image-capturing range obtained by adding the image-capturing range based on the initial image-capturing position, and the image-capturing range based on the image-capturing position in the "confirmed" state among the image-capturing positions for the additional image capturing. In step S1602, the area decision unit 1004 controls the processing performed in steps S1603 and S1604 to be repeated for the number of times of the additional image capturing in the "confirmed" state, with reference to the table illustrated in FIG. 11B. In step S1603, from the image-capturing position/panoramic image-capturing angle of view for the additional image capturing, the area decision unit 1004 determines an image-capturing range in this additional image capturing. In step S1604, the image-capturing range determined in step S1603 is added to the confirmed image-capturing range. In step S1605, the confirmed image-capturing range and the object plane are compared, and a range of the object plane not to be imaged in the initial image capturing and the additional image capturing is determined. This range is hereinafter referred to as the unconfirmed area.

In step S1606, the area decision unit 1004 decides an image-capturing parameter for the panoramic image capturing by the method described in the first exemplary embodiment, using the unconfirmed area determined in step S1605 as a new object plane. In other words, an input of designating the image-capturing position and the image-capturing conditions for additionally imaging the unconfirmed area is received from the user, the processing conforming to the flowchart in FIG. 4 is executed based on the input, and the image-capturing parameter and the image-capturing range are determined anew. Therefore, the user can recognize a range that can be imaged to obtain the necessary resolution by realistically possible panoramic image capturing, as a result of performing an operation of designating the image-capturing position from which image capturing is possible in view of the state of the on-site. Performing the image capturing for imaging the entire unconfirmed area once is not necessarily sufficient. In a case where it is necessary to perform image capturing a plurality of times, it is also possible to present the image-capturing position for another additional image-capturing in step S1606, as described in the second exemplary embodiment.

According to the above-described modification, in a case where the image capturing from the additional image capturing position calculated in the second exemplary embodiment is difficult because of the influence of an obstacle or the like, this is explicitly notified to the user. Subsequently, based on the user-designated image-capturing position for the additional image capturing from which image capturing taking into consideration the position of the obstacle or the like can be actually performed, the image-capturing parameter and the image-capturing range appropriate to the additional image capturing are determined. According to the modification, the work for performing the panoramic image capturing for an object (in particular, a large structure) to obtain an image having a necessary resolution is streamlined, even on a complicated site where an obstacle or the like is present. The work for imaging a surface of a large structure with a high resolution is streamlined, and therefore, in particular, the inspection work utilizing the processing of detecting a deformation occurring in a structure by image analysis is made easy. Even in the modification, even if the processing about the decision or output of the image-capturing parameter is omitted, the above-described effect can be obtained by outputting the image-capturing position appropriate to the on-site situation, as with the second exemplary embodiment.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is easy to capture an image having a necessary resolution, even in panoramic image capturing of capturing an image of a large object.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An information processing apparatus comprising:
one or more processors,
wherein the one or more processors function as
a first acquisition unit configured to acquire information about an image-capturing environment including a physical relationship between an imaging apparatus and an object plane,
a second acquisition unit configured to acquire information indicating a condition about image quality of an image to be captured by the imaging apparatus,
a decision unit configured to decide an image-capturing parameter with which the object plane is fit in a depth of field based on the information about the image-capturing environment acquired by the first acquisition unit, and
a presentation unit configured to present to a user a range that can be imaged on the object plane in the physical relationship in which an image obtained by image capturing with the image capturing apparatus in which the image-capturing parameter is set satisfies the condition about image quality,
wherein the presentation unit presents to the user an operation screen in which the image-capturing parameter decided by the decision unit is selectable, and
wherein the presentation unit presents to the user a range on the object plane in which a plurality of images to be obtained by image capturing with the imaging apparatus in which a combination of the image-capturing parameter selected by the user is set satisfies the condition about image quality.

2. The information processing apparatus according to claim 1, wherein the decision unit decides a combination of a focal distance and an aperture value of a lens of the imaging apparatus, as the image-capturing parameter.

3. The information processing apparatus according to claim 1, wherein the information about the image-capturing environment including the physical relationship between the imaging apparatus and the object plane includes information about the object plane, information about specifications of the imaging apparatus, and information about a positional relationship between an object and the imaging apparatus.

4. The information processing apparatus according to claim 3, wherein the information about the object plane includes information representing a size of the object plane.

5. The information processing apparatus according to claim 4, wherein the information about the object plane includes information representing a width and a height indicating the size of the object plane.

6. The information processing apparatus according to claim 3, wherein the information about the specifications of the imaging apparatus includes information about a lens stored in the imaging apparatus or information about a model of the imaging apparatus.

7. The information processing apparatus according to claim 6, wherein the information about the lens is a range of a focal distance of the lens.

8. The information processing apparatus according to claim 1, wherein the one or more processors further function as an identification unit configured to identify a range on the object plane in which the condition of image quality is satisfied.

9. The information processing apparatus according to claim 1, wherein the one or more processors further function as an comprising a position decision unit configured to decide an image-capturing position for obtaining an image that satisfies the condition about image quality for an entire object plane.

10. The information processing apparatus according to claim 9,
wherein the presentation unit graphically displays the range identified by the identification unit, and the positional relationship between an object and the imaging apparatus, in two dimensions or three dimensions, in a two-dimensional region, and
wherein the presentation unit further explicitly displays the image-capturing position decided by the position decision unit, in the region.

11. The information processing apparatus according to claim 10, wherein the first acquisition unit further acquires information indicating one image-capturing position designated by the user in the area displayed by the presentation unit, among the one or more image-capturing positions of the additional image capturing decided by the position decision unit.

12. The information processing apparatus according to claim 11, wherein the one or more processors further function as an area decision unit configured to decide an area of the object plane not included in an image-capturing range in image capturing performed at an image-capturing position at which the imaging apparatus is installed in an initial state and the image-capturing position designated by the user, based on the information acquired by the first acquisition unit indicating the one image-capturing position designated by the user.

13. The information processing apparatus according to claim 12,
wherein the acquisition unit acquires position information of one image-capturing position moved by the user among the one or more image-capturing positions of the additional image capturing decided by the position decision unit, and
wherein the decision unit further decides an image-capturing parameter for capturing an image in which the object plane is fit in a depth of field and a condition of the necessary resolution is satisfied using the imaging apparatus, based on information about the area decided by the area decision unit, the position information of the image-capturing position moved by the user, and the information about the imaging apparatus.

14. The information processing apparatus according to claim 1,
wherein the object plane is a surface of a structure, and
wherein, in structure inspection work utilizing processing of detecting a deformation occurring in the structure by analyzing an image of the object plane obtained by the image capturing, the condition of the necessary resolution is a condition of a resolution necessary to estimate an actual size of the deformation.

15. A computer-readable storage medium storing a program for causing a computer to function as the information processing apparatus according to claim 1.

16. The information processing apparatus according to claim 1, wherein the decision unit decides a range of the image-capturing parameter with which the object plane is fit in a depth of field based on the information about the image-capturing environment acquired by the first acquisition unit; and
the presentation unit presents to a user a range on the object plane in which an image obtained by image capturing with the image capturing apparatus in which an image-capturing parameter selected by user from the range of the image-capturing parameter is set satisfies the condition about image quality.

17. A control method for an information processing apparatus, the control method comprising:
acquiring information about an image-capturing environment including a physical relationship between an imaging apparatus and an object plane;
acquiring information indicating a condition about image quality of an image to be captured by the imaging apparatus;
deciding an image-capturing parameter with which the object plane is fit in a depth of field based on the information about the image-capturing environment acquired by the first acquisition unit; and
presenting to a user a range that can be imaged on the object plane in the physical relationship in which an image obtained by image capturing with the image capturing apparatus in which the image-capturing parameter is set satisfies the condition about image quality,
wherein presenting comprises:
presenting to the user an operation screen in which the decided image-capturing parameter is selectable, and
presenting to the user a range on the object plane in which a plurality of images to be obtained by image capturing in which a combination of the image-capturing parameter selected by the user is set satisfies the condition about image quality.

* * * * *